(12) United States Patent
Yokozutsumi et al.

(10) Patent No.: US 10,103,675 B2
(45) Date of Patent: Oct. 16, 2018

(54) CONTROL DEVICE OF ALTERNATING-CURRENT ELECTRIC MOTOR

(71) Applicant: Mitsubishi Electric Corporation, Chiyoda-ku, Tokyo (JP)

(72) Inventors: Ryo Yokozutsumi, Tokyo (JP); Hisanori Yamasaki, Tokyo (JP); Sho Kato, Tokyo (JP); Haruyuki Kometani, Tokyo (JP); Kenta Kaneko, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 344 days.

(21) Appl. No.: 14/785,912

(22) PCT Filed: Apr. 23, 2013

(86) PCT No.: PCT/JP2013/061946
§ 371 (c)(1),
(2) Date: Oct. 21, 2015

(87) PCT Pub. No.: WO2014/174597
PCT Pub. Date: Oct. 30, 2014

(65) Prior Publication Data
US 2016/0072424 A1 Mar. 10, 2016

(51) Int. Cl.
*H02P 3/00* (2006.01)
*H02P 27/08* (2006.01)
(Continued)

(52) U.S. Cl.
CPC ............ *H02P 27/08* (2013.01); *B60L 15/025* (2013.01); *H02M 7/53875* (2013.01);
(Continued)

(58) Field of Classification Search
CPC ... H02P 27/08; H02P 21/0035; H02P 21/0003
(Continued)

(56) References Cited

U.S. PATENT DOCUMENTS 5,155,675 A 10/1992 Maruyama et al.
5,659,235 A * 8/1997 Yamada ................ B60L 15/025
(Continued)

FOREIGN PATENT DOCUMENTS

JP 2566021 B2 12/1996
JP 2654118 B2 9/1997
(Continued)

OTHER PUBLICATIONS

International Search Report (PCT/ISA/210) dated Jul. 9, 2013, by the Japanese Patent Office as the International Searching Authority for International Application No. PCT/JP2013/061946.
(Continued)

*Primary Examiner* — Eduardo Colon Santana
*Assistant Examiner* — Gabriel Agared
(74) *Attorney, Agent, or Firm* — Buchanan Ingersoll & Rooney PC

(57) ABSTRACT

A control device includes a gate-signal generating unit that outputs a gate signal to an inverter circuit and a voltage-vector generating unit that generates a voltage command to the gate-signal generating unit on the basis of a torque command PTR from an upper unit, rotating speed FM of an alternating-current electric motor, and a direct-current voltage value EFC applied to the inverter circuit. The voltage-vector generating unit calculates, on basis of a modulation rate, which is a ratio of the direct-current voltage value EFC and a voltage amplitude command in the voltage command, a PWM current distortion rate serving as an index representing a degree of a current harmonic caused by PWM control, generates the voltage amplitude command value on (Continued)

the basis of the calculated PWM current distortion rate, and outputs the voltage amplitude command value to the gate-signal generating unit.

10 Claims, 25 Drawing Sheets

(51) Int. Cl.
    *B60L 15/02*     (2006.01)
    *H02M 7/5387*     (2007.01)
    *H02P 21/00*     (2016.01)
    *H02P 21/22*     (2016.01)
    *H02P 27/14*     (2006.01)

(52) U.S. Cl.
    CPC ...... *H02P 21/0003* (2013.01); *H02P 21/0035* (2013.01); *H02P 21/22* (2016.02); *H02P 27/085* (2013.01); *H02P 27/14* (2013.01); *H02M 2007/53876* (2013.01); *Y02T 10/643* (2013.01)

(58) Field of Classification Search
    USPC .......................................................... 318/503
    See application file for complete search history.

(56) References Cited

U.S. PATENT DOCUMENTS

| | | | |
|---|---|---|---|
| 5,907,225 A * | 5/1999 | Kim | H02P 6/085 318/400.01 |
| 8,278,855 B2 | 10/2012 | Kitanaka | |
| 2009/0218968 A1* | 9/2009 | Jeung | H02P 6/085 318/400.04 |
| 2010/0066283 A1* | 3/2010 | Kitanaka | B60L 11/1803 |
| 2010/0087971 A1 | 4/2010 | Yamasaki | |
| 2010/0134053 A1 | 6/2010 | Yamada et al. | |
| 2010/0140003 A1* | 6/2010 | Saha | B60L 15/025 180/65.285 |
| 2011/0074320 A1* | 3/2011 | Nakamura | H02P 5/74 318/400.02 |
| 2011/0193509 A1* | 8/2011 | Ooyama | H02M 1/12 318/503 |
| 2012/0032620 A1* | 2/2012 | Shimada | H02P 21/0089 |
| 2012/0173066 A1* | 7/2012 | Yamada | B60L 11/1803 701/22 |
| 2013/0049656 A1* | 2/2013 | Yasui | H02P 21/00 318/400.02 |
| 2014/0049198 A1 | 2/2014 | Ooyama et al. | |
| 2014/0232307 A1 | 8/2014 | Yokozutsumi et al. | |
| 2014/0232318 A1 | 8/2014 | Yokozutsumi et al. | |

FOREIGN PATENT DOCUMENTS

| | | | |
|---|---|---|---|
| JP | 11-285299 A | 10/1999 | |
| JP | 2005-86920 A | 3/2005 | |
| JP | 3700019 B2 | 9/2005 | |
| JP | 2008-113543 A | 5/2008 | |
| JP | 2010-104234 A | 5/2010 | |
| JP | 4489091 B2 | 6/2010 | |
| JP | 2010-154735 A | 7/2010 | |
| JP | 2012-110079 A | 6/2012 | |
| JP | 4956611 B2 | 6/2012 | |
| WO | WO 2008/107992 A1 | 9/2008 | |
| WO | WO 2009/057188 A1 | 5/2009 | |
| WO | WO 2011/099122 A1 | 8/2011 | |
| WO | WO 2013/046461 A1 | 4/2013 | |
| WO | WO 2013/046462 A1 | 4/2013 | |

OTHER PUBLICATIONS

Written Opinion (PCT/ISA/237) dated Jul. 9, 2013, by the Japanese Patent Office as the International Searching Authority for International Application No. PCT/JP2013/061946.

Notice of Rejection issued in the corresponding Japanese Application No. 2015-513403, with English Translation of Office Action.

* cited by examiner

CONTROL DEVICE OF ALTERNATING-CURRENT ELECTRIC MOTOR

FIELD

The present invention relates to a control device of an alternating-current electric motor.

BACKGROUND

As a control device of an alternating-current electric motor according to the conventional technology, for example, Patent Literature 1 described below describing a control device of an electric vehicle discloses a technology for calculating, according to a torque command value, a first magnetic flux command value for minimizing a loss of the alternating-current electric motor and a second magnetic flux command value, which is a magnetic flux command value in controlling the alternating-current electric motor in a one-pulse mode, calculating a sum of a loss of the alternating-current electric motor and a loss of a main circuit in the case of control with the first magnetic flux command value and a sum of a loss of the alternating-current electric motor and a loss of the main circuit in the case of control with the second magnetic flux command value, and selecting the magnetic flux command value corresponding to a smaller sum of the losses.

Note that, in addition to Patent Literature 1, Patent Literatures 2 to 4 and Non Patent Literature 1 described below and the like are also publicly-known literatures that disclose technologies concerning control of the alternating-current electric motor (hereinafter referred to as "electric motor" as appropriate according to necessity). These literatures are referred to as appropriate in embodiment explained below.

CITATION LIST

Patent Literature

Patent Literature 1: Japanese Patent No. 4956611
Patent Literature 2: Japanese Patent No. 2654118
Patent Literature 3: Japanese Patent Application Laid-Open No. H11-285299
Patent Literature 4: Japanese Patent No. 2566021

Non Patent Literature

Non Patent Literature 1: Hidehiko Sugimoto "Theory and Practical Design of an AC Servo System" Sogo Denshi Shuppan 1990

SUMMARY

Technical Problem

However, according to the conventional technology, although a fundamental wave loss characteristic of the electric motor has been taken into account, a harmonic loss due to PWM (Pulse Width Modulation) control is not taken into account. Therefore, room for improvement is left for a reduction in a loss of the electric motor.

The present invention has been devised in view of the above and it is an object of the present invention to provide a control device for an alternating-current electric motor that enables a further reduction in an electric motor loss.

Solution to Problem

In order to solve the aforementioned problems, a control device of an alternating-current electric motor according to one aspect of the present invention is constructed in such a manner as to include: an inverter circuit that converts direct-current power into alternating-current power and supplies the alternating-current power to an alternating-current electric motor; a direct-current-voltage detecting unit that detects a direct-current voltage value applied to the inverter circuit; a speed detecting unit that detects rotating speed of the alternating-current electric motor; an electric-motor-current detecting unit that detects an alternating current amount output from the inverter circuit to the alternating-current electric motor; a gate-signal generating unit that outputs a gate signal to the inverter circuit; and a voltage-vector generating unit that generates a voltage command to the gate-signal generating unit on the basis of a torque command from an upper unit, the rotating speed, the direct-current voltage value, and the alternating current amount. The voltage-vector generating unit calculates, on basis of a modulation rate, which is a ratio of the direct-current voltage value and a voltage amplitude command value in the voltage command, a PWM current distortion rate serving as an index representing a degree of a current harmonic caused by PWM control, generates the voltage amplitude command value on the basis of the calculated PWM current distortion rate, and outputs the voltage amplitude command value to the gate-signal generating unit.

Advantageous Effects of Invention

According to the present invention, there is an effect that it is possible to further reduce an electric motor loss.

BRIEF DESCRIPTION OF DRAWINGS

FIG. 3-1 is a diagram showing a relation between a modulated wave and a carrier wave in an asynchronous mode of a two-level inverter.

FIG. 3-2 is a diagram showing an output voltage waveform in the asynchronous mode of the two-level inverter.

FIG. 4-1 is a diagram showing a relation between a modulated wave and a carrier wave in a synchronous multi-pulse mode of the two-level inverter.

FIG. 4-2 is a diagram showing an output voltage waveform in the synchronous multi-pulse mode of the two-level inverter.

FIG. 5-1 is a diagram showing a relation between a modulated wave and a carrier wave in a synchronous 3'-pulse mode of the two-level inverter.

FIG. 5-2 is a diagram showing an output voltage waveform in the synchronous 3'-pulse mode of the two-level inverter.

FIG. 6-1 is a diagram showing a relation between a modulated wave and a carrier wave in a synchronous 1-pulse mode of the two-level inverter.

FIG. 6-2 is a diagram showing an output voltage waveform in the synchronous 1-pulse mode of the two-level inverter.

FIG. 18-1 is a diagram showing a relation between a modulated wave for three levels and a carrier wave for three levels in an asynchronous mode of a three-level inverter.

FIG. 18-2 is a diagram showing an output voltage waveform in the asynchronous mode of the three-level inverter.

FIG. 19-1 is a diagram showing a relation between a modulated wave for three levels and a carrier wave for three levels in a synchronous 15-pulse mode of the three-level inverter.

FIG. 19-2 is a diagram showing an output voltage waveform in the synchronous 15-pulse mode of the three-level inverter.

FIG. 20-1 is a diagram showing a relation between a modulated wave for three levels and a carrier wave for three levels in a synchronous 1'-pulse mode (a modulation rate is 90%) of the three-level inverter.

FIG. 20-2 is a diagram showing an output voltage waveform in the synchronous 1'-pulse mode (the modulation rate is 90%) of the three-level inverter.

FIG. 21-1 is a diagram showing a relation between a modulated wave for three levels and a carrier wave for three levels in the synchronous 1'-pulse mode (the modulation rate is 100%) of the three-level inverter.

FIG. 21-2 is a diagram showing an output voltage waveform in the synchronous 1'-pulse mode (the modulation rate is 100%) of the three-level inverter.

DESCRIPTION OF EMBODIMENTS

Exemplary embodiments of the present invention are explained below with reference to the accompanying drawings. Note that the present invention is not limited by the embodiments explained below.

First Embodiment

Figure 1:
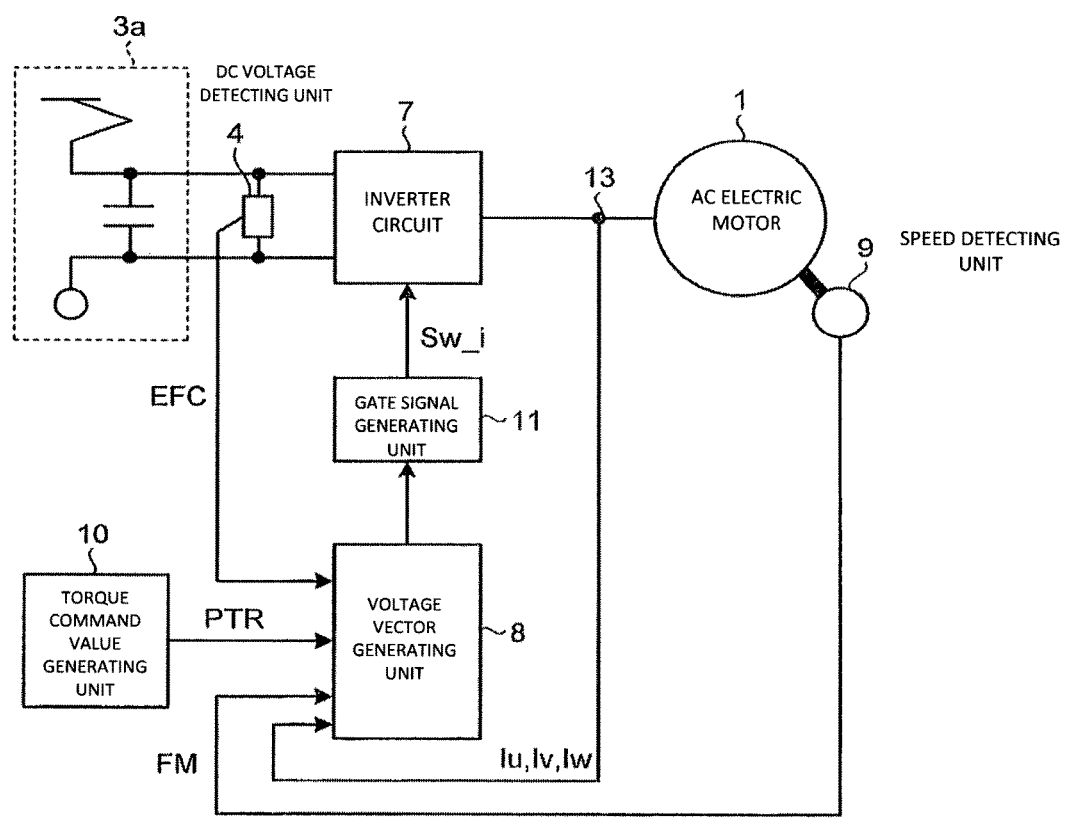
FIG. 1 is a diagram showing the configuration of a direct-current-electric-vehicle driving system including a control device of an alternating-current electric motor according to a first embodiment.

FIG. 1 is a diagram showing the configuration of a direct-current-electric-vehicle driving system including a control device of an alternating-current electric motor according to a first embodiment of the present invention. As shown in FIG. 1, the direct-current-electric-vehicle driving system according to the first embodiment includes an alternating-current electric motor (e.g., an induction electric motor or a synchronous electric motor) 1 that generates torque as power of an electric vehicle, a speed detecting unit 9 that measures rotating speed FM of the alternating-current electric motor 1, a direct-current power supply unit 3a configured from an overhead wire, a pantograph, a filter capacitor, and the like, a direct-current-voltage detecting unit 4 that detects a direct-current voltage value EFC of the direct-current power supply unit 3a, an inverter circuit 7 that converts, on the basis of a control signal (a gate signal Sw_i) from a gate-signal generating unit 11 explained below, direct-current power from the direct-current power supply unit 3a into alternating-current power and supplies the alternating-current power to the alternating-current electric motor 1, an electric-motor-current detecting unit 13 that detects alternating current amounts Iu, Iv, and Iw to the alternating-current electric motor 1 output from the inverter circuit 7, a torque-command-value generating unit 10 that generates a command value of torque (hereinafter referred to as "torque command value PTR"), which the alternating-current electric motor 1 is caused to generate, on the basis of control command information of steering wheel operation or the like of a driver in a driver's seat and outputs the torque command value PTR, and a voltage-vector generating unit 8 that is provided subordinately to the torque-command-value generating unit 10 and generates a voltage command V* including elements such as a modulation rate command, a phase angle command, and a frequency command on the basis of the torque command value PTR from the torque-command-value generating unit 10, the alternating current amounts Iu, Iv and Iw from the electric-motor-current detecting unit 13, the rotating speed FM from the speed detecting unit 9, and the direct-current voltage value EFC from the direct-current-voltage detecting unit 4 and outputs the voltage command V* to the gate-signal generating unit 11. Note that the detailed configurations of the voltage-vector generating unit 8 and the gate-signal generating unit 11 are explained below.

Figure 2:
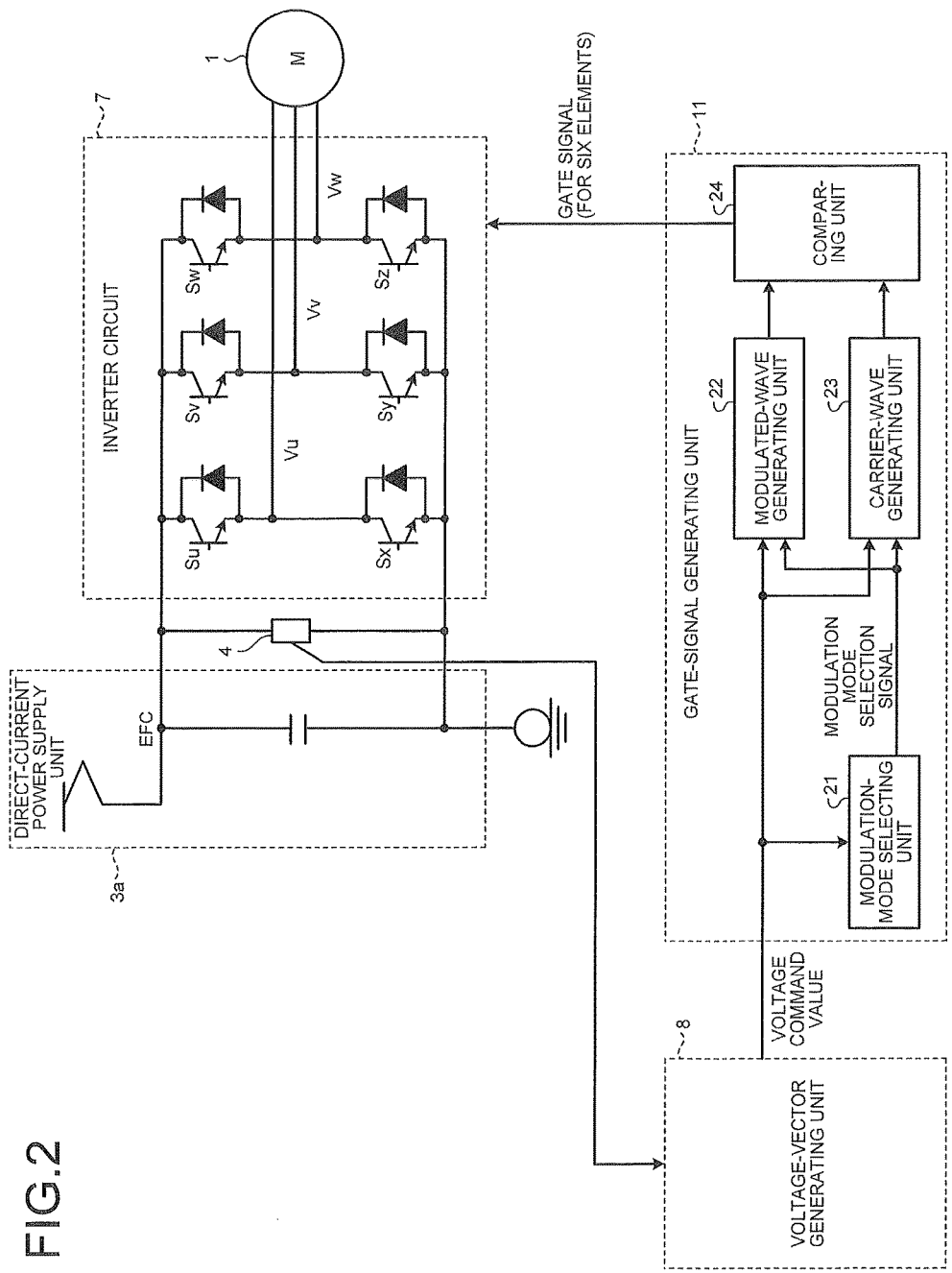
FIG. 2 is a diagram showing the detailed configurations of an inverter circuit and a gate-signal generating unit in the first embodiment.

FIG. 2 is a diagram showing the detailed configurations of the inverter circuit 7 and the gate-signal generating unit 11 in the first embodiment.

In FIG. 2, the inverter circuit 7 is an example of a two-level inverter. In the inverter circuit 7, six semiconductor switching elements Su, Sv, Sw, Sx, Sy, and Sz are provided. Two of the semiconductor switching elements are connected in series. Arm circuits each having intermediate potential, which is the potential at a connection end of the semiconductor switching elements, as an output voltage are provided by a number equivalent to output phases. In FIG. 2, to obtain three-phase output voltages Vu, Vv, and Vw, an u-phase arm including switches Su and Sx, a v-phase arm including switches Sv and Sy, and a w-phase arm including switches Sw and Sz are configured. The operation of the gate-signal generating unit 11 is explained below centering on the operation of the switches Su and Sx of the u-phase arm.

Figures 1, 3:
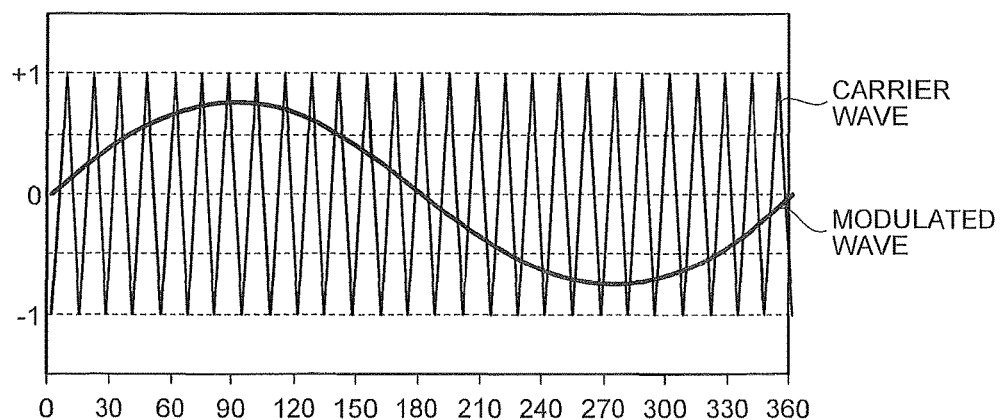
Figures 2, 3:
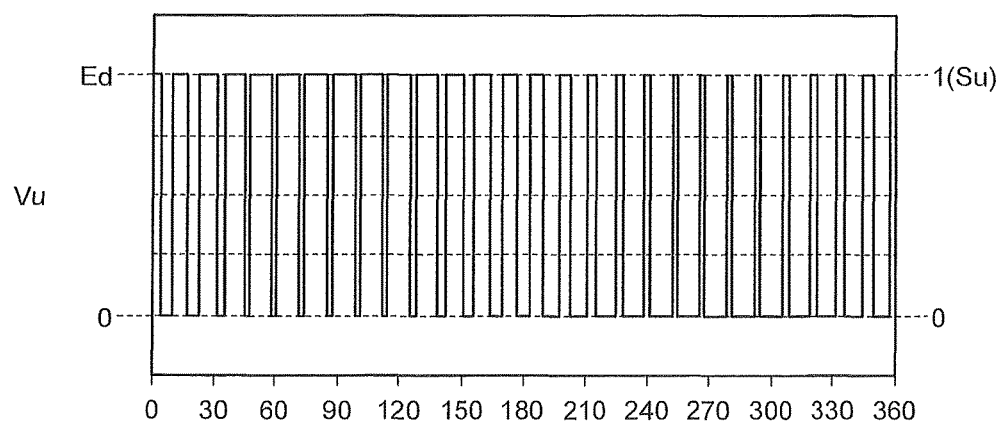

The gate-signal generating unit 11 includes a modulation-mode selecting unit 21, a modulated-wave generating unit 22, a carrier-wave generating unit 23, and a comparing unit 24. In this gate-signal generating unit 11, the modulated-wave generating unit 22 generates a modulated wave on the basis of the voltage command V* output by the voltage-vector generating unit 8. The modulated wave is input to the comparing unit 24 together with a carrier wave output by the carrier-wave generating unit 23. Note that examples of the modulated wave and the carrier wave are shown in FIG. 3-1.

The modulated wave is a waveform signal obtained by standardizing a command waveform of an output voltage with the direct-current voltage EFC of the direct-current power supply unit to generate a gate signal. The modulated wave indicates αu, αv, and αw calculated by formulas described below according to an output of the voltage-vector generating unit 8.

$$PMF = \frac{2}{\pi} \cdot \frac{|V|*}{EFC} \quad (1.1)$$

$$\begin{pmatrix} \alpha u \\ \alpha v \\ \alpha w \end{pmatrix} = \frac{4}{\pi} \cdot PMF \cdot \begin{pmatrix} \sin\theta* \\ \sin\left(\theta* - \frac{2}{3}\pi\right) \\ \sin\left(\theta* + \frac{2}{3}\pi\right) \end{pmatrix} \quad (1.2)$$

In the above formulas, PMF represents a modulation rate command. The voltage-vector generating unit 8 calculates the modulation rate command PMF on the basis of an amplitude command value |V|* of the three-phase output voltages of the inverter circuit and the direct-current voltage value EFC of the direct-current power supply unit 3a. θ* represents a reference phase angle of the three-phase output voltages. Note that the reference phase angle θ* changes at higher speed as an operation frequency command is higher.

The comparing unit 24 compares the carrier wave and the modulated wave and outputs a gate signal for commanding (i) if the modulated wave> the carrier wave, an upper element: ON and a lower element: OFF and (ii) if the modulated wave< the carrier wave, the upper element: OFF and the lower element: ON.

The upper element corresponds to Su in the case of the u phase and the lower element corresponds to Sx in the case of the u phase. An example of an output voltage output when the gate signal obtained in this way is input to the switching elements of the inverter circuit is shown in FIG. 3-2.

In FIG. 3-2, as the output voltage of the two-level inverter, a value of 0 or a direct-current power supply voltage Ed is output according to ON/OFF operation of the upper element and the lower element (hereinafter referred to as "upper and lower elements") (*Note: in this explanation, a voltage drop of the elements is assumed to be very small and neglected). Note that, in FIG. 2, signal lines corresponding to the three phases are collected as one line and shown. However, the voltage-vector generating unit 8 outputs signals of the respective three phases. The modulated-wave generating unit 22, the carrier-wave generating unit 23, and the comparing unit 24 also perform arithmetic operations of the respective three phases. Concerning the v phase and the w phase, waveforms respectively shifted 120 deg and 240 deg at an electric angle from the waveforms shown in FIG. 3-1 and FIG. 3-2 are output.

The modulated-wave generating unit 22 and the carrier-wave generating unit 23 switch a waveform of the modulated wave or the carrier wave referring to a modulation mode selection signal from the modulation-mode selecting unit 21. The gate-signal generating unit 11 has, for example, modulation modes explained below and switches and operates the modes according to a voltage command (an operation condition for a three-phase alternating current load). In general, according to an increase in a modulated wave frequency (an operation frequency of an alternating-current load), operation for transitioning from (1) to (3) and (4) is performed.

(1) Asynchronous Mode (See FIG. 3-1 and FIG. 3-2)

An asynchronous mode is a mode for setting the carrier wave to, for example, several hundred hertz and outputting the carrier wave independently and asynchronous with the modulated wave.

Figures 1, 4:
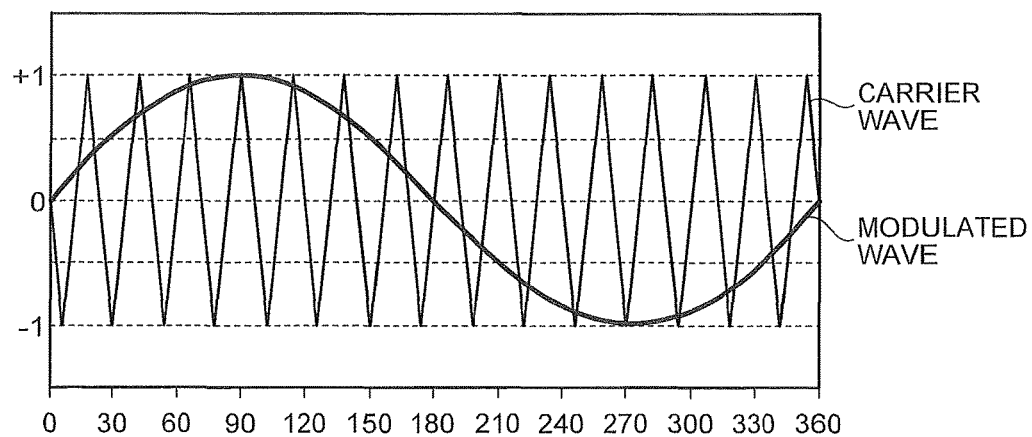
Figures 2, 4:
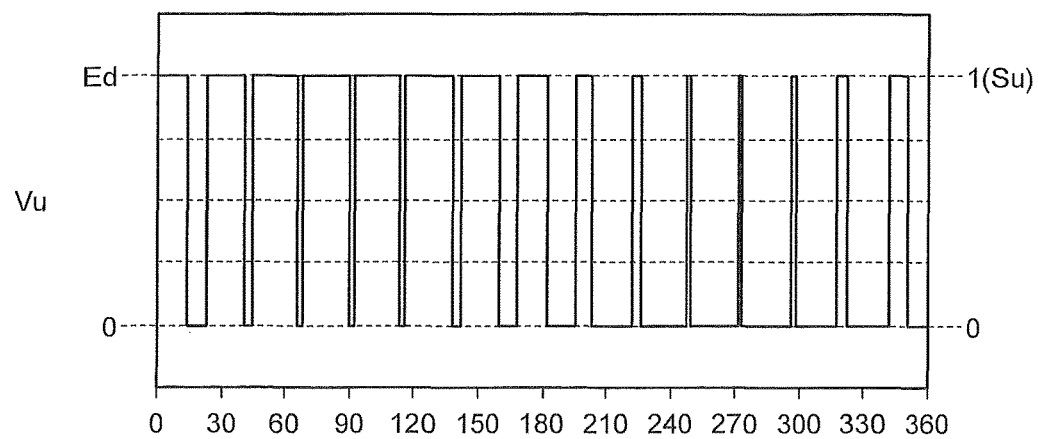

(2) Synchronous Multi-Pulse Mode (See FIG. 4-1 and FIG. 4-2)

A synchronous multi-pulse mode is a mode for fixing, under a condition that a modulated wave frequency (an operation frequency of an alternating-current load) is high, a ratio of a modulated wave frequency and a carrier wave frequency to suppress distortion of an output voltage waveform and synchronizing each of output waveforms. In general, to make a pulse waveform of a PWM modulation result positive/negative symmetry and electric angle 180 deg symmetry, the carrier wave is synchronized with the modulated wave such that the carrier wave is also in the positive/negative center and overlap the modulated wave at a positive/negative center point (electric angle 0, 180 deg timing) of the modulated wave as shown in FIG. 3-2.

(3) Synchronous 3-Pulse Mode (Including 3-Dash (Also Simply Referred to as "3'") Pulse Mode; See FIG. 5-1 and FIG. 5-2)

A synchronous 3-pulse mode is a mode for smoothly transitioning the output voltage amplitude of the inverter main circuit to a maximum. To smoothly transition the modulation mode from the synchronous multi-pulse mode to a 1-pulse mode (a maximum voltage mode) explained in the next paragraph, a dedicated modulated wave and a dedicated carrier wave are output.

Figures 1, 6:
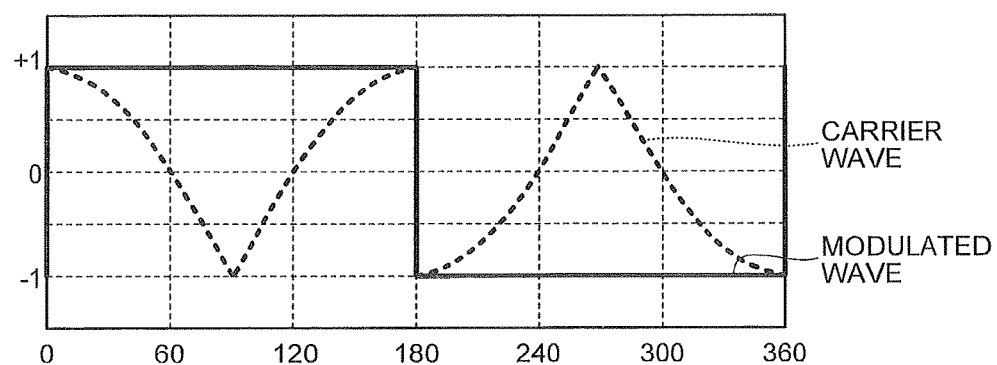
Figures 2, 6:
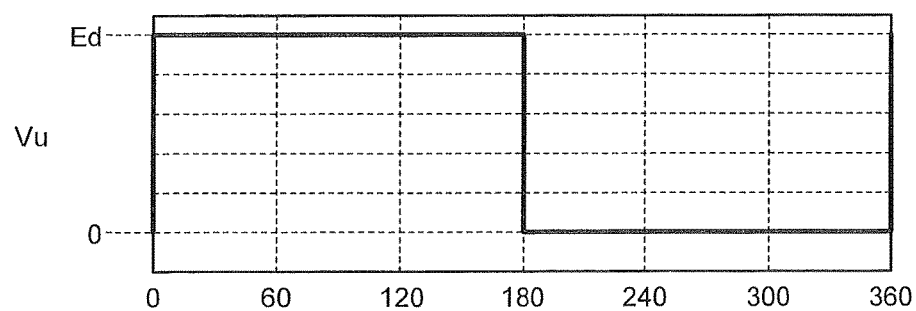

(4) Synchronous 1-Pulse Mode (See FIG. 6-1 and FIG. 6-2)

A synchronous 1-pulse mode is a maximum voltage mode for performing switching only at every electric angle 180 deg. If the modulation rate command PMF is set to 100% in the 3'-pulse mode in (3), a form of the modulated wave and the carrier wave is the 1-pulse mode.

Note that (1) is a technology also described in Non Patent Literature 1 described above. (2) is an applied technology of (1). On the other hand, (3) and (4) are technologies disclosed in Patent Literature 2 described above. A modulated wave different from the modulated wave indicated by Formula (1.2) described above and a carrier wave, which is not a triangular wave, are output.

Figures 1, 5:
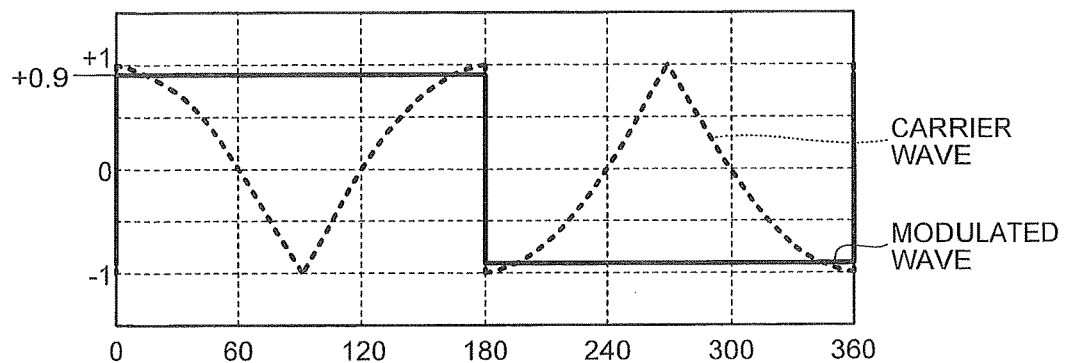
Figures 2, 5:
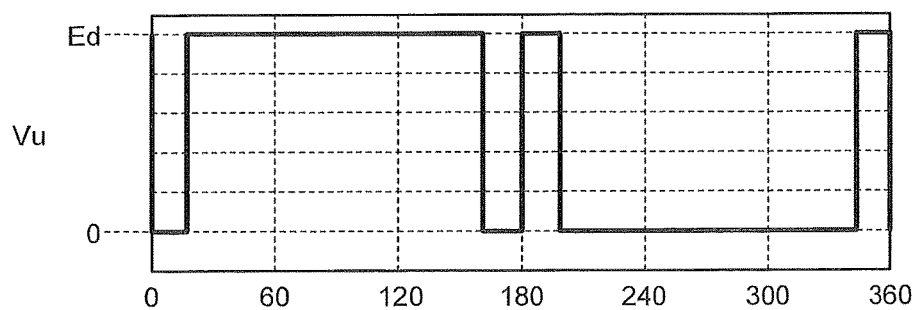

A waveform shown in FIG. 5-1 is additionally explained. In FIG. 5-1, the modulated wave (a waveform of a thick solid line) and the carrier wave (a waveform of a thick broken line) are described as follows.

The modulated wave (the u phase): A square wave, the positive and negative of which are switched at the voltage phase angle command θ*=0, 180 deg and the amplitude of which is the modulation rate command PMF.

The carrier wave (the u phase): A waveform conforming to the following formula.

$$\left.\begin{array}{ll}|2\cos\theta^*|-1 & (0\leq\theta^*<180\,[\text{deg}])\\ -|2\cos\theta^*|+1 & (180\leq\theta^*<360\,[\text{deg}])\end{array}\right\} \quad (1.3)$$

A background of switching the modulated wave and the carrier wave as indicated by (1) to (4) according to the modulated wave frequency (the operation frequency of the alternating-current load) is additionally explained.

When a three-phase alternating-current load is driven at a low frequency, in the situation of (1) in which the carrier wave is set to, for example, several hundred hertz, it is possible to obtain a desired output voltage waveform of PWM modulation and smoothly drive a load. However, when the three-phase alternating current load is, for example, the alternating-current electric motor 1 in this embodiment and the alternating-current electric motor 1 performs acceleration operation, the carrier wave (the triangular wave) in one cycle of the modulated wave, that is, the number of switchings relatively decreases. In this case, symmetry of the output voltage waveform is spoiled and a control error and pulsation of an output voltage appear. Here, if a frequency command (the frequency command is explained below) from the voltage-vector generating unit 8 exceeds a certain threshold, the modulation mode is transitioned to the mode of (2) (the synchronous multi-pulse mode) for synchronizing the carrier wave with the modulated wave.

In the mode of (2), when a ratio of the carrier wave and the modulated wave (the carrier wave/the modulated wave) is fixed, the frequency of the carrier wave continues to rise in a higher speed region. In this case, there is a disadvantage that a switching loss of the inverter circuit 7 is increased and cooling design of an apparatus is made difficult. Therefore, the frequency of the carrier wave is reduced while the carrier wave and the modulated wave are kept synchronized, but an ultimate form of this is the synchronous 3'-pulse mode and the 1-pulse mode.

Besides the limitation of the carrier wave frequency due to the switching loss explained above, the synchronous 1-pulse mode further has meaning that the synchronous 1-pulse mod is provided to continue operation while satisfying a limitation that the operation is performed with a voltage fixed to a maximum voltage that the inverter circuit can output.

Figure 7:
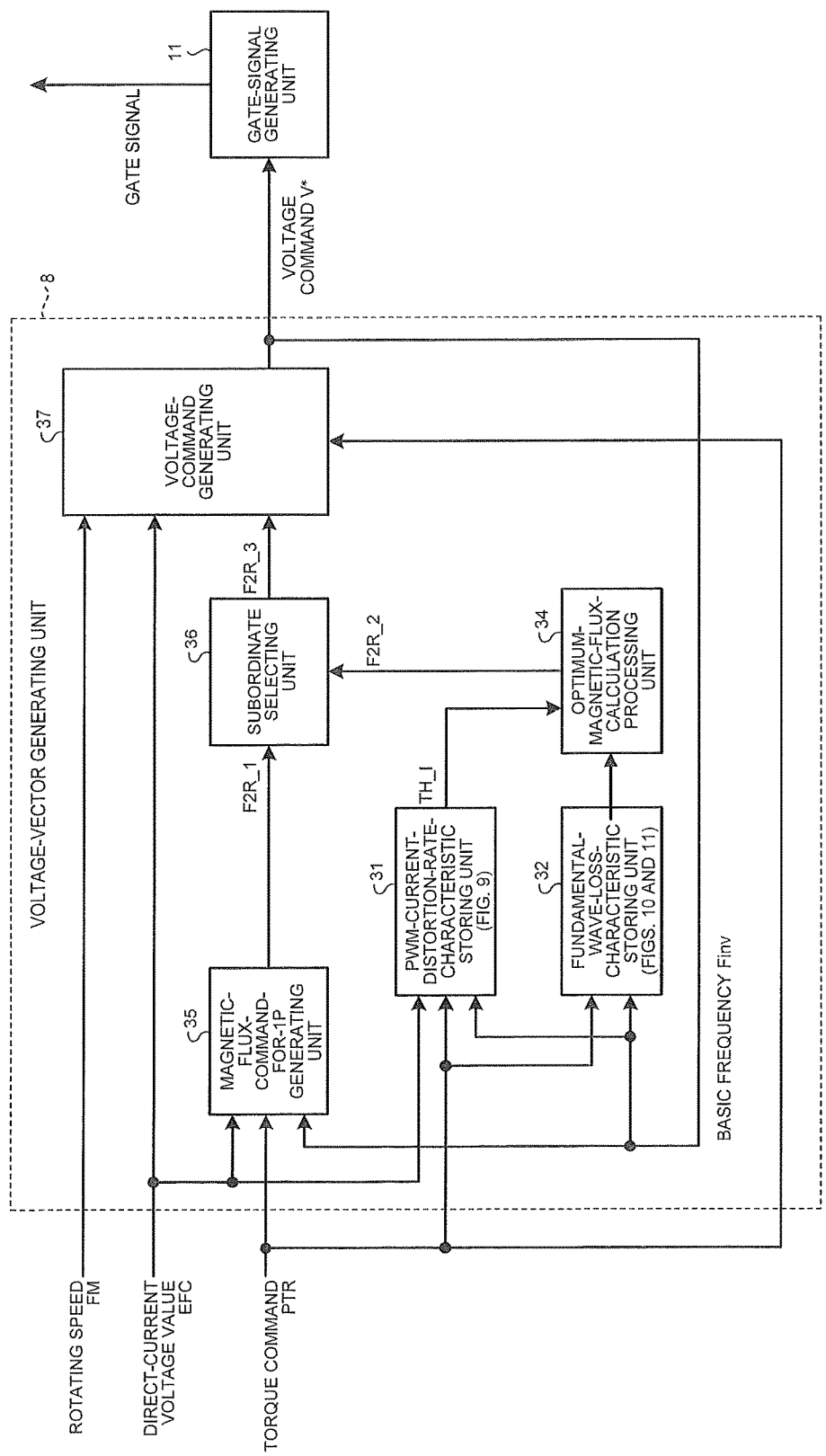
FIG. 7 is a diagram showing the detailed configuration of a voltage-vector generating unit in the first embodiment.

Next, generation processing for a voltage vector based on a current distortion operation, which is one of characteristics of the first embodiment, is explained. FIG. 7 is a diagram showing the detailed configuration of the voltage-vector generating unit 8. The voltage-vector generating unit 8 includes a PWM-current-distortion-rate-characteristic storing unit 31, a fundamental-wave-loss-characteristic storing unit 32, an optimum-magnetic-flux-calculation processing unit 34, a magnetic-flux-command-for-1-pulse (hereinafter abbreviated as "1P") generating unit 35, a subordinate selecting unit 36, and a voltage-command generating unit 37.

The voltage-command generating unit 37 is a processing unit that calculates, on the basis of the rotating speed FM from the alternating-current electric motor 1, the torque command PTR from an upper unit, and a magnetic flux command F2R_3 from the final stage (in an example shown in FIG. 7, the subordinate selecting unit 36), a command value of a voltage that should be applied to the alternating-current electric motor 1. The voltage-command generating unit 37 can be configured using the conventional technology related to the vector control of the alternating-current electric motor described in Non Patent Literature 1 described above.

Note that the voltage-command generating unit 37 in the first embodiment outputs, as the voltage command V*, a phase angle command θ*, which is phase angle information of the voltage command V*, a frequency command ωinv*, which is frequency information of the voltage command V*, a modulation rate command α*, which is amplitude information of the voltage command V*, and the like to the gate-signal generating unit 11. Note that the voltage-command generating unit 37 can output, instead of the modulation rate command α*, the modulation rate PMF explained in Formula (1.1) described above to the gate-signal generating unit 11.

The PWM-current-distortion-rate-characteristic storing unit 31, the fundamental-wave-loss-characteristic storing unit 32, and the optimum-magnetic-flux-calculation processing unit 34 associate with one another for the purpose of minimizing a loss of the alternating-current electric motor 1, and calculate an optimum magnetic flux command F2R_2 (details of the principle thereof are explained below) according to a fundamental wave frequency Finv of the inverter, the torque command PTR, and the input direct-current voltage EFC.

The magnetic-flux-command-for-1P generating unit 35 is a processing unit that is configured using, for example, the technology described in Patent Literature 3 described above, and inversely calculates a magnetic flux command F2R_1 for setting the result PMF of the modulation rate calculation in Formula (1.1) described above to the maximum "1", that is, 180 degrees energization and outputs the magnetic flux command F2R_1.

The subordinate selecting unit 36 selects a magnetic flux command value having a smaller value of the magnetic flux command F2R_2 from the optimum-magnetic-flux-calculation processing unit 34 and the upper limit magnetic flux F2R_1 from the magnetic-flux-command-for-1P generating unit 35 (which is also an upper limit voltage that the inverter circuit 7 can output), and outputs the magnetic flux command value to the voltage-command generating unit 37 as the magnetic flux command F2R_3 at the final stage. When it is attempted to operate the alternating-current electric motor 1 with the magnetic flux command F2R_2 that takes into account only the condition for minimizing a loss, under a high-speed and large-output condition in the alternating-current electric motor 1, an output voltage exceeds the upper limit voltage that the inverter circuit 7 can output. The alternating-current electric motor 1 shifts to an operation region where the modulation rate exceeds 1, and it made difficult to continue stable operation. On the other hand, when the subordinate selecting unit 36 selects the upper limit magnetic flux F2R_1 fixed to the output voltage maximum condition (the modulation rate 1), it is made possible to continue stable operation even under the high-speed and large-output condition.

A calculation method for the magnetic flux command F2R_2 by the PWM-current-distortion-rate-characteristic storing unit 31, the fundamental-wave-loss-characteristic storing unit 32, and the optimum-magnetic-flux-calculation processing unit 34 is explained.

Figure 8:
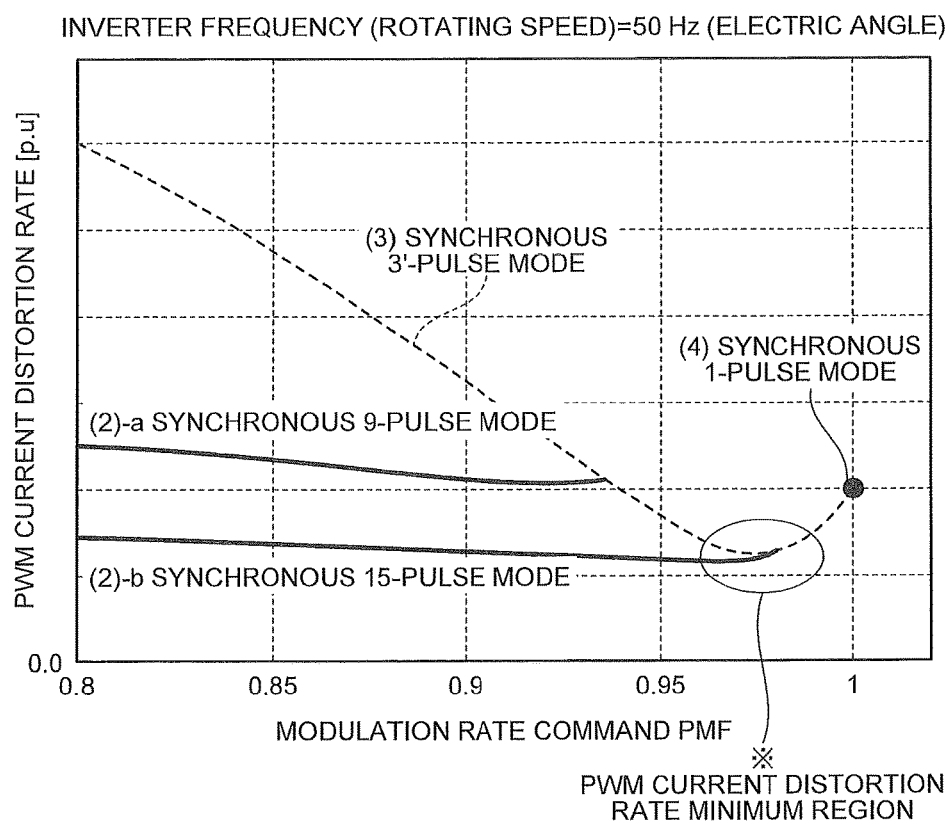
FIG. 8 is a characteristic chart in which PWM current ratios in respective pulse modes are estimated.

FIG. 8 is a characteristic chart in which PWM current distortion rates in the respective pulse modes are estimated. The PWM current distortion rates are indexes representing levels (degrees) of current harmonics generated by the PWM control. The characteristic chart of FIG. 8 shows how a PWM current distortion rate obtained when the induction electric motor is driven by the inverter circuit changes with respect to the modulation rate command PWM. Note that, in FIG. 8, the modulation modes are three modes described below.

(2)-a: Synchronous 9-pulse mode
(2)-b: Synchronous 15-pulse mode
(3): Synchronous 3'-pulse mode In order to have characteristics obtained when the modulation rate command PMF is changed at fixed rotating speed, an inverter frequency is set to 50 hertz (an electric angle). The "PWM current distortion rate" represented by the ordinate is a pu value of a square sum of a current harmonic (a current distortion amount, which is an index representing a degree of the current harmonic) obtained when the PWM control is performed in each of the modes. Note that various kinds of control explained below can be performed using a value, which is not the pu value, that is, a "PWM current distortion amount".

As explained above, in the synchronous 3'-pulse mode of (3), a state in which the modulation rate is the maximum 1 is the 1-pulse mode of (4). Note that, when the modulation rate is 0.75 or less in general, the modulation mode shifts to the asynchronous mode of (1). However, because the shift to the asynchronous mode is unrelated to the calculation processing for the PWM current distortion rate in the first embodiment, explanation is omitted.

It is seen from FIG. 8 that, in a region where the modulation rate command PMF is 0.9 or less, because a current ripple is smaller as the number of switchings is larger, the PWM current distortion rate is made smaller. As the PWM current distortion rate and the current ripple are smaller, a harmonic loss in the alternating-current electric motor 1 can be reduced, and magnetostrictive sound and a torque ripple also decrease. Therefore, a more preferred operation characteristic is obtained. However, if the number of switchings is excessively increased, a switching loss of the inverter circuit 7 increases. Therefore, there is a design limitation that it is necessary to determine a pulse mode taking into account the performance of a cooler of the inverter circuit 7. In this case, when design for reducing an element loss is possible using a wide gap semiconductor such as SiC, this pulse mode limitation is relaxed, and thus, a pulse mode with a larger number of pulses can be used and the PWM current distortion can be reduced. As a result, as shown in FIG. 8, there is an effect that it is made easy to perform setting for more smoothly connecting distortion rate characteristics up to the maximum modulation rate of 1.

On the other hand, when the modulation rate exceeds 0.9, so-called overmodulation occurs in which a peak of the modulated wave exceeds a carrier wave peak. For example, when a carrier wave and a modulated wave for the 9-pulse mode are compared, switching timing in the vicinity of the modulated wave peak disappears, the number of pulses is curtailed, and the number of pulses per one cycle of an electric angle of a voltage gradually decreases from 9. The same applies when the carrier wave is a carrier wave for the 15-pulse mode. The number of pulses decreases according to an increase of the modulation rate to 0.9 or more. In this way, the voltage waveform gradually approaches the 3'-pulse mode. Therefore, the current waveform and the PWM current distortion rate also gradually approach the 3'-pulse mode. This is the reason why the PWM current distortion rates in the respective pulse modes gradually approach the 3'-pulse mode at the modulation rate of 0.94 to 0.97 in FIG. 8.

Therefore, in the first embodiment, switching of the pulse mode is carried out in a state in which the PWM current distortion rates in the respective pulse modes are the same or sufficiently small. For example, when the synchronous 9-pulse mode is adopted, switching to the synchronous 3'-pulse is performed in the vicinity of the modulation rate of 94%. When the synchronous 15-pulse mode is adoptable, the switching to the synchronous 3'-pulse is performed in the vicinity of the modulation rate of 97%. Consequently, in each of the selectable PWM modes, it is possible to smoothly carry out the mode switching. The PWM current distortion rate of the synchronous 3'-pulse mode has a minimum point in the vicinity of the modulation rate of 0.97. In the first embodiment, this characteristic is effectively used as explained below.

Figure 9:
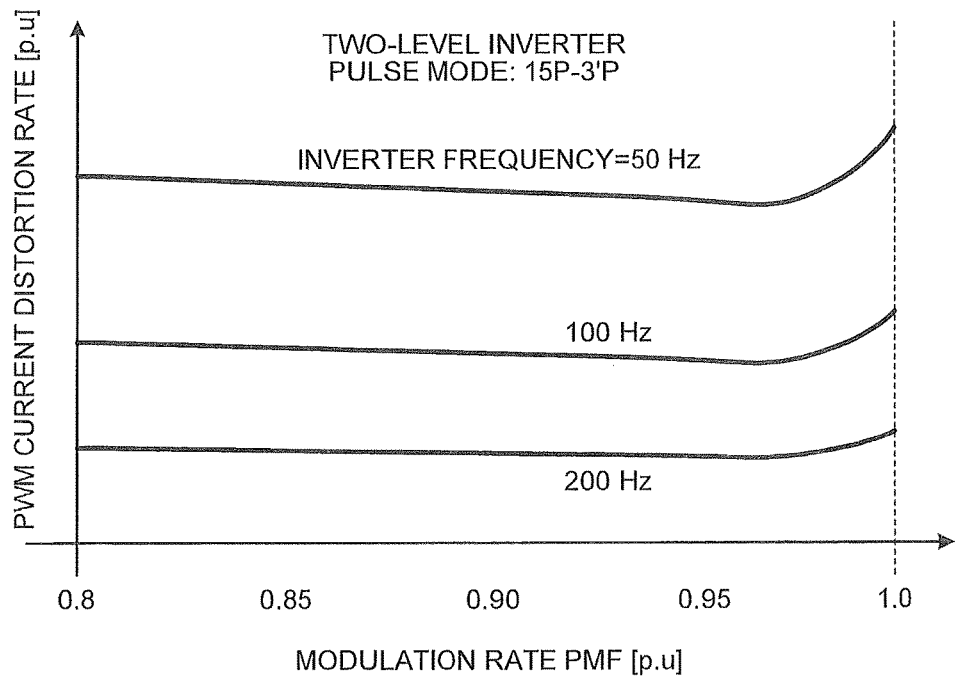
FIG. 9 is a diagram showing an example of a PWM current distortion rate characteristic implemented in a PWM-current-distortion-rate-characteristic storing unit in the first embodiment.

On the other hand, FIG. 9 is a diagram (a graph) in which the PWM current distortion rate obtained when the pulse mode is switched from the 15-pulse mode to the 1-pulse mode as explained above without causing discontinuity is described for each of inverter fundamental wave frequencies (=rotating speed). Under a condition of a fixed fundamental wave current, the PWM current distortion rates at rotating speeds of 50, 100, and 200 hertz are shown. The impedance of the alternating-current electric motor includes an inductance component and a resistance component. However, at a high frequency, the inductance component is predominant. Therefore, a current harmonic is lower as a frequency is higher. It is seen from FIG. 9, although a point where the PWM current distortion amount is the minimum is present in the vicinity of the modulation rate of 97% as in FIG. 8, when the frequency increases and the current harmonic and the PWM current distortion amount decrease as a whole, an inflection characteristic of the PWM current distortion amount becomes less conspicuous.

Therefore, in the first embodiment, for example, a characteristic of the PWM current distortion rate shown in FIG. 9 under a representative frequency condition is calculated from the voltage waveform in each of the pulse modes output by the inverter circuit 7 and the impedance characteristic of the alternating-current electric motor 1, and implemented in the PWM-current-distortion-rate-characteristic storing unit 31. The PWM-current-distortion-rate-characteristic storing unit 31 recalculates the PWM current distortion amount according to the frequency on the basis of the inverter fundamental wave frequency, and outputs the PWM current distortion amount to the optimum-magnetic-flux-calculation processing unit 34 explained below.

A specific calculation example and a specific implementation example of the PWM current distortion rate are explained. First, a relation between a sum TH_1 of current harmonics and a sum of voltage harmonics is assumed as indicated by the following formula.

$$TH\_I = \sum_{k=2}^{\infty} Ih(k)^2 \approx \underbrace{\sum_{k=2}^{\infty} \left(\frac{Vh(k)}{\sigma Ls \cdot k \cdot \omega}\right)^2 = \left(\frac{1}{\omega \cdot \sigma Ls}\right)^2 \cdot \sum_{k=2}^{\infty} \left(\frac{Vh(k)}{k}\right)^2}_{X} \quad (1.4)$$

Meanings of signs in the above formula are as described below.
Ih(k): A k-th order component of a phase current of an electric motor current
Vh(k): A k-th order component of a phase voltage
ω: An inverter fundamental wave frequency
σLs: Leak inductance of the alternating-current electric motor Note that the above Formula (1.4) is an approximate calculation formula that neglects a resistance component in an impedance component of a harmonic and gives a linear fixed value concerning the impedance component as well. However, in the form of a square sum of a harmonic of an electric current, the relation with a harmonic component of a voltage can be approximately described.

As shown in FIG. 4-2, FIG. 5-2, and FIG. 6-2, in the synchronous PWM, the PWM voltage waveform is uniquely determined by the modulation method (the pulse mode) and the modulation rate. That is, a harmonic distribution in a voltage (a portion of X in Formula (1.4) corresponds to the harmonic distribution) is uniquely determined by the pulse mode and the modulation rate.

Further, a use range of the pulse mode is divided according to the modulation rate as explained above. Therefore, in the first embodiment, the X is only one characteristic chart with respect to the modulation rate and can be easily recorded.

Consequently, the PWM-current-distortion-rate-characteristic storing unit 31 implements one PWM current distortion rate characteristic to the modulation rate in the portion of the X as X(PMF) converted into a map or converted into an approximation function. The PWM-current-distortion-rate-characteristic storing unit 31 divides the X(PMF) by a square of leak inductance and a square of the inverter fundamental wave frequency to simply calculate a square sum of a harmonic current as a square sum of the PWM harmonic current during operation, and outputs the square sum as the PWM current distortion amount TH_1 related to the PWM current distortion rate.

The above explanation is an explanation concerning the operation of the PWM-current-distortion-rate-characteristic storing unit 31 related to the PWM current distortion rate and the modulation rate. The operation of the fundamental-wave-loss-characteristic storing unit 32 is explained below. First, as a technology for operating the alternating-current electric motor 1 with high efficiency, Patent Literature 1 and the like explained in the section of the background are known.

Figure 10:
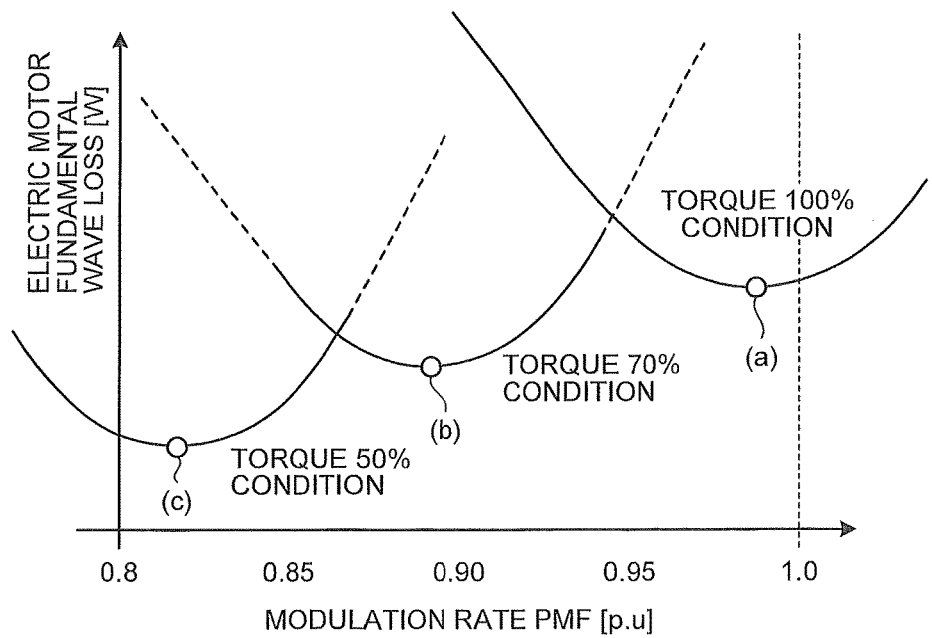
FIG. 10 is a diagram showing an example of a fundamental wave loss characteristic implemented in a fundamental-wave-loss-characteristic storing unit.
Figure 11:
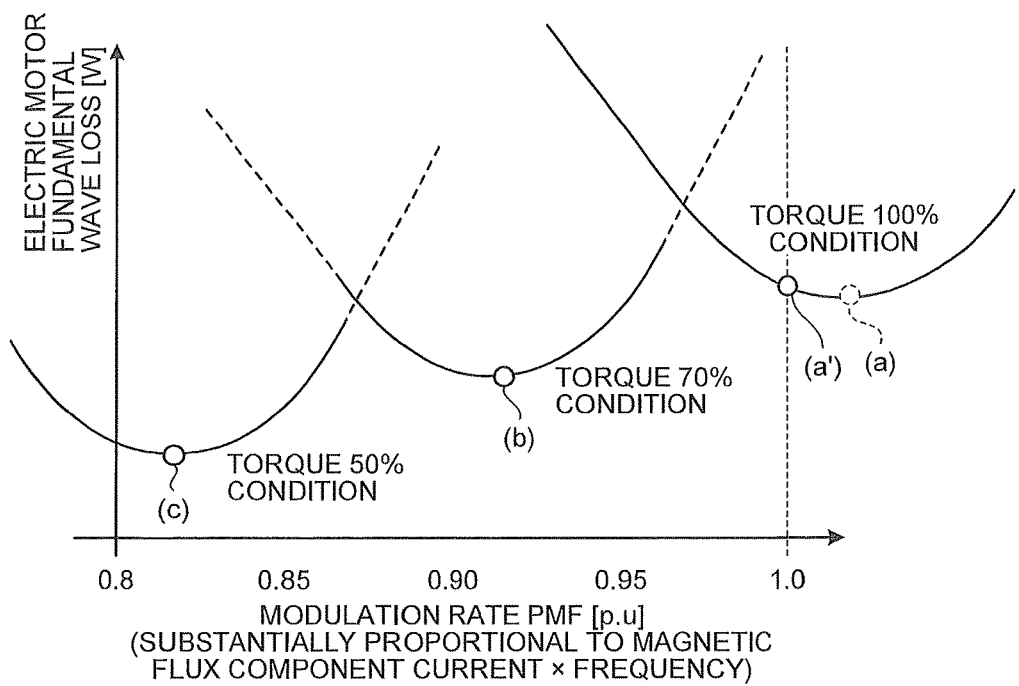
FIG. 11 is a diagram showing another example of the fundamental wave loss characteristic implemented in the fundamental-wave-loss-characteristic storing unit.

Patent Literature 1 is a literature that discloses a technology for changing the magnitude of a magnetic flux according to torque to reduce a useless excitation component current and reduce a fundamental wave loss. FIG. 10 and FIG. 11 are diagrams for explaining an overview of this technology. The relation between a modulation rate and an electric motor fundamental wave loss under a specific speed condition is schematically shown.

There is a relation indicated by formulas described below between a current amount (a torque component current and an excitation component current) related to the torque and a loss component (a primary copper loss, a secondary copper loss, and an iron loss) related to the electric motor fundamental wave loss.

$$(1.5)$$

Torque ∞ magnetic flux× torque component current ∞
excitation component current× torque component current $$(1.6)$$

Electric motor fundamental wave loss =
primary copper loss + secondary copper loss + iron loss $$\begin{cases} \text{Primary copper loss} \infty \text{ excitation component current}^2 + \\ \text{torque component current}^2 \\ \text{Secondary copper loss} \infty \text{ torque component current}^2 \\ \text{Ion loss} \infty \text{ excitation component current}^2 \\ \text{(actually, more complicated because there are a saturation} \\ \text{characteristic and frequency dependency of other magnetic} \\ \text{fluxes)} \end{cases}$$

As it is it is possible to understand from the relation of the above two formulas, a current vector condition for minimizing the electric motor fundamental wave loss under a predetermined torque condition is present. If qualitatively explained, it is possible to reduce the electric motor fundamental wave loss by optimizing a current ratio of an excitation component and a torque component, which outputs predetermined torque, and suppressing a useless torque component current. Note that the iron loss also has a frequency dependency besides the magnitude of the magnetic flux and has a complicated characteristic. However, it is possible to take measures intended by this application by calculating a magnetic flux condition, which is a loss minimization condition, focusing on excitation component current dependency at respective operation points.

In FIG. 10 and FIG. 11, the abscissa represents the modulation rate PMF (a component proportional to an input voltage of the alternating-current electric motor). The modulation rate PMF is substantially proportional to a magnetic flux×speed. That is, under a certain specific speed fixed condition, because the modulation rate PMF is proportional to an excitation component current, the figures can be grasped as representing characteristics of the electric motor fundamental wave loss under respective torque conditions with the excitation component current plotted on the abscissa. It is seen that an optimum condition for the excitation component current for minimizing the electric motor fundamental wave loss is present for each of torques. However, when speed as an operation condition and a desired torque command are large, if it is attempted to obtain an excitation component current for satisfying a fundamental wave loss minimum condition such as a loss minimum condition (a) of a torque 100% condition in FIG. 11, an induction voltage of the electric motor becomes excessively large and exceeds an condition of a voltage that can be output by the inverter circuit 7, and there is a condition under which operation is impossible. In that case, as explained above, the magnetic flux command F2R_2 is switched to the magnetic flux commend F2R_1 for fixing an output voltage maximum condition (the modulation rate PMF=1, (a') point in FIG. 11) according to the action of the magnetic-flux-command-for-1P generating unit and the subordinate selecting unit 36 at the post stage. In this case, although deviating from the fundamental wave loss minimum condition, there is an advantage that stable operation can be continued.

The first embodiment can be realized by calculating the characteristics shown in FIG. 10 and FIG. 11 from a torque command condition, a speed condition, a circuit constant of the alternating-current electric motor 1, and the like and implementing the characteristics in the fundamental-wave-loss-characteristic storing unit 32.

Processing for calculating the optimum magnetic flux F2R_2 in the optimum-magnetic-flux-calculation processing unit 34 using the PWM-current-distortion-rate-characteristic storing unit 31 and the fundamental-wave-loss-characteristic storing unit 32 is explained.

Both of the PWM current distortion rate characteristic in FIG. 9 implemented in the PWM-current-distortion-rate-characteristic storing unit 31 and the fundamental wave loss characteristic in FIGS. 10 and 11 implemented in the fundamental-wave-loss-characteristic storing unit 32 are implemented with the modulation rate plotted on the abscissa, that is, in a form in which the characteristics are substantially proportional to the excitation component current. In general, to minimize a fundamental wave loss, a total loss is often described with a magnetic flux component current or a magnetic flux plotted on the abscissa to calculate an optimum magnetic flux amount. However, the total loss is described again with the modulation rate plotted on the abscissa using the relational expression (see the formula below) described as [Math 4] in Patent Literature 1 described above and Formula (1.1) described above.

[Math 4]

$$Win2 = Wm + \frac{R2 \cdot T*}{pm \cdot F2F2^2} \quad (12)$$

$$Vd2*= R1 \cdot \frac{F2R2}{M} - \sigma L1 \cdot Winv2 \cdot \frac{L2 \cdot T*}{pm \cdot M \cdot F2R2} \quad (13)$$

$$Vq2*= R1 \cdot \frac{L2 \cdot T*}{pm \cdot M \cdot F2R2} + Winv2 \cdot \frac{L1}{M} \cdot F2R2 \quad (14)$$

$$|V|2 = \sqrt{Vd2*^2 + Vq2*^2} \quad (15)$$

The characteristic implemented in the PWM-current-distortion-rate-characteristic storing unit 31 is a characteristic due to a PWM mode determined from cooling design and the like of the inverter circuit 7. The characteristic implemented in the fundamental-wave-loss-characteristic storing unit 32 is a characteristic due to the alternating-current electric motor 1. However, by describing the characteristics on a common abscissa and with a common argument and implementing the characteristics, it is made possible to output outputs of both of the PWM-current-distortion-rate-characteristic storing unit 31 and the fundamental-wave-loss-characteristic storing unit 32 to the optimum-magnetic-flux-calculation processing unit 34. The optimum-magnetic-flux-calculation processing unit 34, to which the outputs are input, calculates, with a processing operation including an assumption explained below, an overall loss value that takes into account a PWM harmonic current in the alternating-current electric motor 1 shown in FIG. 13 and FIG. 14. Note that TH_1 has a dimension of a square of an electric current as indicated by Formula (1.4) described above.

$$\text{Electric motor total loss =} \quad (1.8)$$
$$\text{iron loss + primary copper loss + secondary copper loss}$$

$$\begin{cases} \text{Primary copper loss} \propto (\text{excitation component current}^2 + \\ \quad \text{torque component}^2 + TH\_1) \\ \text{Secondary copper loss} \propto (\text{torque component current}^2 + k1*TH\_1) \\ \text{Iron loss} \propto (\text{excitation component current}^2 + k2*TH\_1) \end{cases}$$

Note that k1 and k2 in the above formula can be put, for example, as indicated by the following formula.

$$k1=(\text{torque component current}^2)/(\text{excitation component current}^2+\text{torque current}^2)$$

$$k2=(\text{excitation component current}^2)/(\text{excitation component current}^2+\text{torque current}^2) \quad (1.9)$$

Originally, a strict description of the iron loss is extremely complicated. In particular, because a strict description of a solution of k2 is difficult, optimum condition monitoring on the copper loss side is possible even if k2 is experimentally determined taking into account, for example, a degree of influence of the iron loss on the total loss or set as k2=0 assuming that the influence of the harmonic loss can be neglected.

Figure 13:
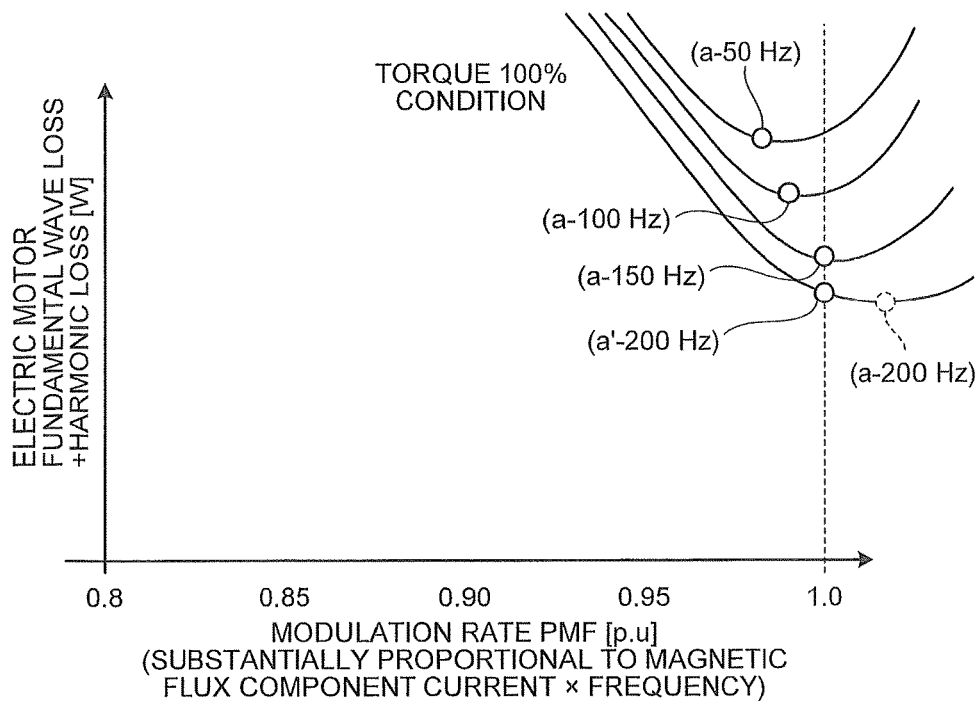
FIG. 13 is a diagram showing an example of an overall loss characteristic that takes into account a PWM harmonic current in the alternating-current electric motor.
Figure 14:
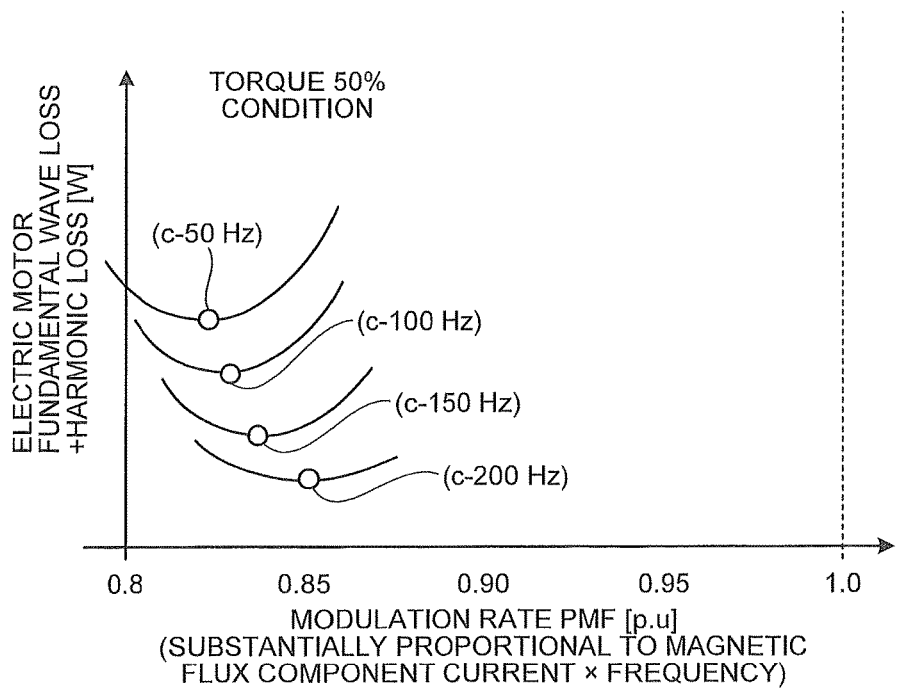
FIG. 14 is a diagram showing an example (in the case of a light load) of the overall loss characteristic that takes into account the PWM harmonic current in the alternating-current electric motor.

Note that summation results of the PWM harmonic loss characteristic and the electric motor fundamental wave loss characteristic at speeds 50, 100, 150, and 200 hertz are respectively shown under an output condition of torque 100% in FIG. 13 and under an output condition of torque 50% (a light load) in FIG. 14. In each of the characteristics, loss minimum condition points at each operation speed are indicated by white circle signs "0" and conditions of frequencies are added to the signs.

Figure 12:
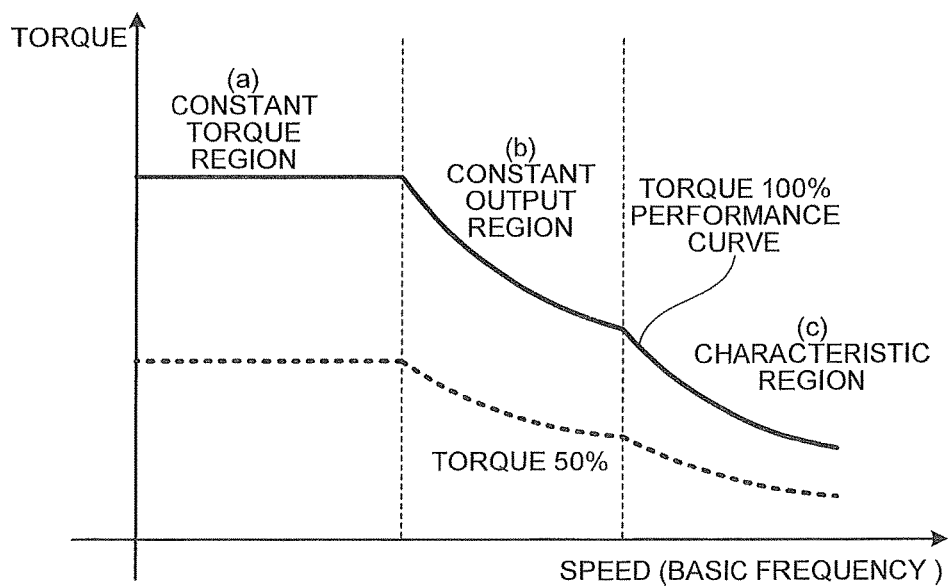
FIG. 12 is a diagram showing an example of a characteristic of a torque command PTR, which is given to the alternating-current electric motor, to speed.

The "torque 100%" and the "torque 50%" are additionally explained. FIG. 12 is an example of a characteristic of a torque command PTR, which is given to the alternating-current electric motor subjected to vector control, to speed. The "torque 100%" in this specification involves the characteristic of the torque command PTR to speed shown in FIG. 12 and is output according to speed (fundamental wave frequency) conditions or given as a control command. In general, (a) the "torque 100%" is given as fixed torque in a low-speed region equal to or lower than rated speed (a constant torque region) and (b) torque having a characteristic inversely proportional to speed is given in a speed region in the vicinity of rated speed. That is, a machine output (a product of torque and speed) of the alternating-current electric motor in (b) is fixed, and (b) is called constant output region. In a high-speed region (c), an output limit characteristic of torque is a characteristic inversely proportional to a square of speed from a relation between a direct-current input voltage of the inverter circuit 7 and a circuit constant of the alternating-current electric motor. Therefore, the characteristic inversely proportional to the square of the speed is sometimes given to realize stable torque control. Note that, in this specification, a characteristic of 50% torque is assumed as a characteristic obtained by simply reducing a torque value to a half in all speed regions with respect to the 100% performance explained above. However, a method of giving a torque command in a range of maximum performance or less is various depending on uses.

In the fundamental wave loss characteristics shown in FIGS. 10 and 11, an optimum magnetic flux and an optimum modulation rate for minimizing a loss are present according to torque and speed (frequency) conditions. On the other hand, as shown in FIG. 9, the PWM current distortion rate has a characteristic that the PWM current distortion rate is the minimum in the vicinity of the modulation rate of 97%. Therefore, in FIGS. 13 and 14 in which a loss (W) on the ordinate of the fundamental wave loss characteristics shown in FIGS. 10 and 11 is multiplied with a "coefficient" using the PWM current distortion rate, a modulation rate further shifted to the modulation rate 97% side than a modulation rate condition of a fundamental wave loss minimum can be calculated as a minimum condition of a combined overall loss of a fundamental wave loss and a harmonic loss. In this case, a current distortion, which causes the PWM harmonic loss, decreases at a higher frequency according to an increase in an electric motor impedance as indicated by a plurality of frequency conditions in FIG. 9. Therefore, the "coefficient" is smaller in a higher-speed region. A magnetic flux amount more weighted for a reduction in the fundamental wave loss is calculated as an optimum magnetic flux.

However, when it is attempted to drive the inverter circuit 7 directly using the optimum magnetic flux F2R_2 obtained by the optimum-magnetic-flux-calculation processing unit 34, in particular, in a high-speed region and under a large torque condition, a voltage amplitude command value equal to or larger than the voltage that the inverter circuit 7 can output (equal to or larger than the modulation rate 1) is output as a voltage amplitude command value. A driving condition of the alternating-current electric motor 1 does not coincide with a commanded driving condition, and a control error occurs in torque control itself. A part of this situation is shown in FIG. 13. In FIG. 13, under conditions of a torque output of 100% and a frequency of 200 Hz, to obtain an electric motor loss minimum condition, a magnetic flux and a modulation rate in the figure (a–200 Hz) are necessary. However, values of the magnetic flux and the modulation rate cannot be output under a condition in the inverter circuit 7.

Therefore, as explained above, a smaller value of the minimum magnetic flux F2R_2, which is the output of the optimum-magnetic-flux-calculation processing unit 34, and the magnetic flux command F2R_1, which is the output of the magnetic-flux-command-for-1P generating unit 35, is selected by the subordinate selecting unit 36 and then input to the voltage-command generating unit 37. Consequently, it is made possible to continue operation while smoothly switching the loss minimum condition and the condition of the voltage that can be output by the inverter circuit 7. Specifically, in the case of FIG. 13, an operation point in the magnetic flux F2R_1 of the 1-pulse condition is indicated by (a'–200 Hz). For example, when acceleration is performed from the electric angle frequency of 150 hertz at the torque of 100%, operation is continued with the modulation rate and the magnetic flux condition transitioned to the modulation rate and the magnetic flux condition of the 1-pulse operation, which are output upper limit values, in such a manner as (a–150 Hz)→(a'–200 Hz) rather than (a–150 Hz)→(a–200 Hz) while maintaining the loss minimum condition in a range in which the inverter circuit 7 can output a voltage.

Figure 15:
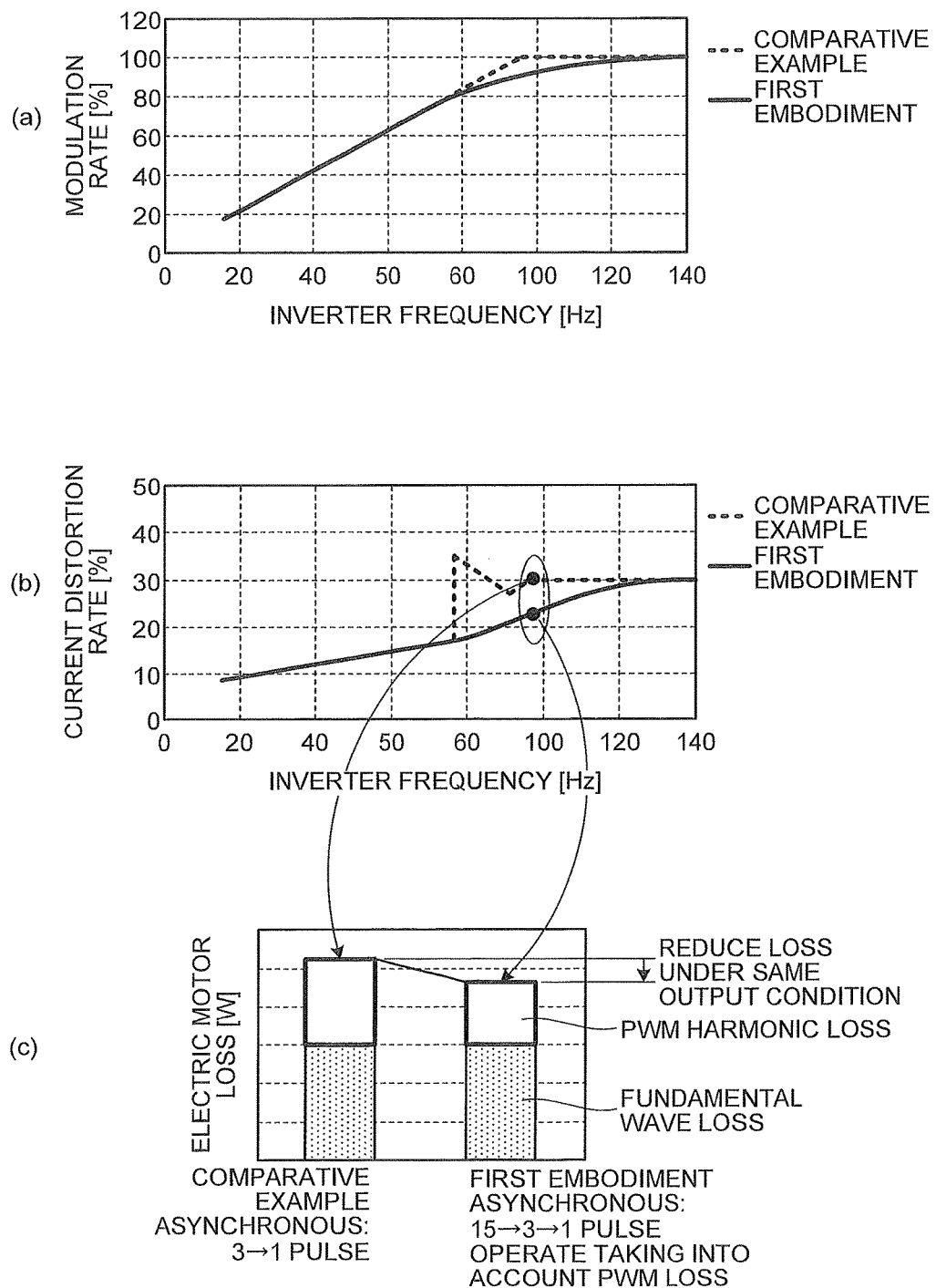
FIG. 15 is a diagram showing a comparison result of an electric motor loss in the first embodiment and an electric motor loss in a comparative example.
Figure 16:
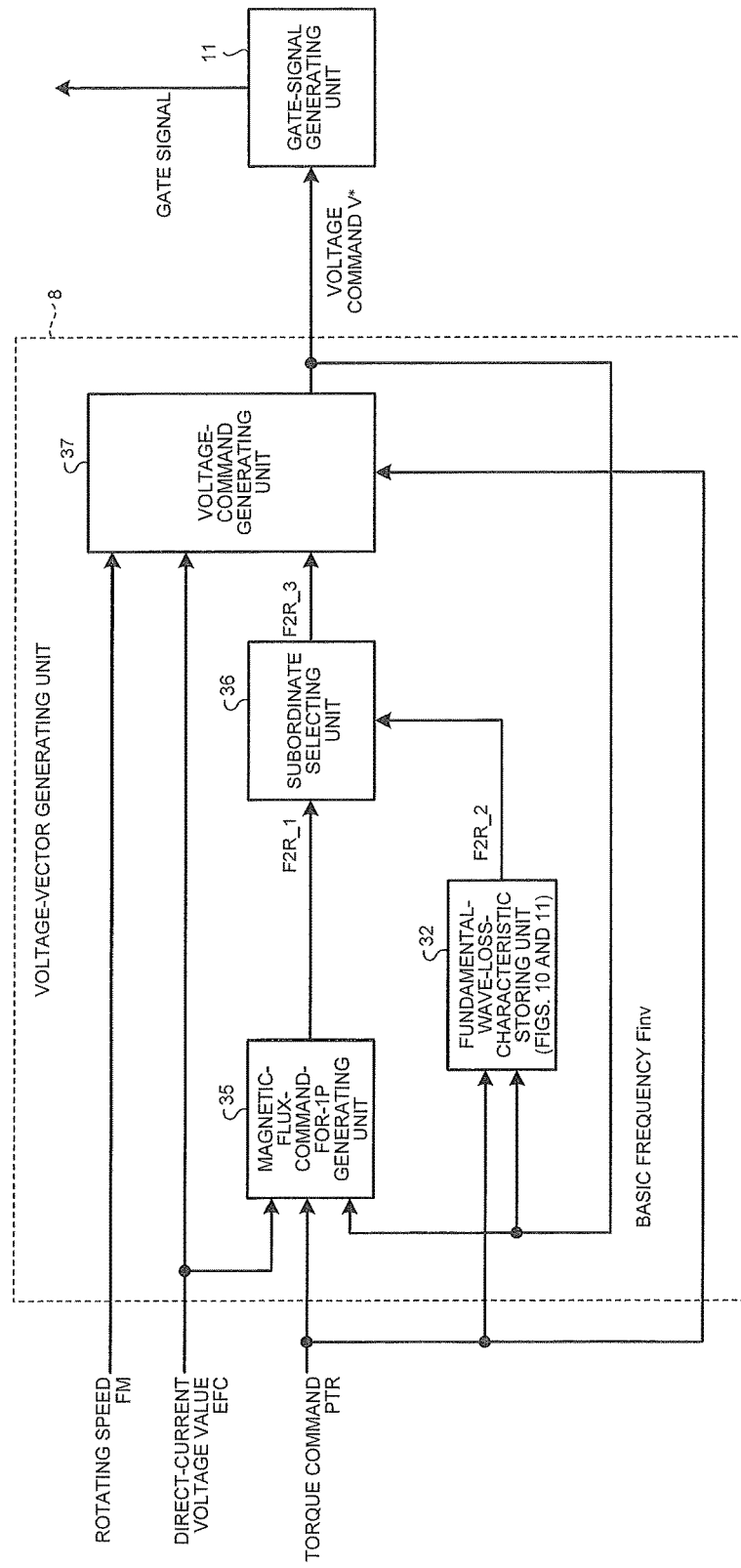
FIG. 16 is a diagram showing the configuration of a voltage-vector generating unit used in the comparative example.

In FIG. 15, a comparison result of an electric motor loss in the first embodiment and an electric motor loss in a comparative example is shown. The comparative example is a form in which the configuration of the voltage-vector generating unit 8 does not include the PWM-current-distortion-rate-characteristic storing unit 31 and the optimum-magnetic-flux-calculation processing unit 34 in FIG. 16. It is assumed that the modulation-mode selecting unit 21 in the gate-signal generating unit 11 performs control for performing PWM mode selection for prioritizing smallness of the number of mode switchings over the PWM distortion amount.

FIG. 15(*a*) shows a relation between an inverter frequency and a modulation rate obtained when the electric motor is accelerated under the torque 100% condition. FIG. 15(*b*) shows a relation between the inverter frequency and a PWM current distortion rate. In the comparative example, the pulse mode is transitioned from the asynchronous PWM mode to the 3-pulse mode at a frequency lower than the frequency in the first embodiment. Therefore, the PWM current distortion rate increases stepwise in the vicinity of a switching frequency (in this example, 58 hertz). On the other hand, in the first embodiment, for example, as shown in FIG. 8, it is possible to maintain the PWM current distortion rate low by transitioning the pulse mode like (2)-b→(3) and suppress a PWM loss, magnetostrictive sound, and the like caused by the electric motor by transitioning the mode not to suddenly change.

In the comparative example, as a result of taking into account only a reduction in a fundamental wave loss, the modulation rate reaches 100% at a lower frequency. On the other hand, in the first embodiment, because the electric motor is operated by selecting a magnetic flux command that takes into account not only the fundamental wave loss but also a harmonic loss from a current distortion due to the PWM. Therefore, the electric motor is operated at a modulation rate slightly lower than the modulation rate of the operation in the comparative example. In FIG. 15(*c*), an electric motor loss in the comparative example and an electric motor loss in the first embodiment are compared under a frequency condition that the modulation rate of 100% is selected in the operation in the comparative example. In particular, details of the fundamental wave loss and the PWM harmonic loss are shown.

When the first embodiment and the comparative example are compared, in the first embodiment, the electric motor is operated according to the magnetic flux command that takes into account a loss sum including the harmonic loss due to the PWM. As a result, compared with the comparative example in which the electric motor is operated taking into account only the reduction in the fundamental wave loss, although the fundamental wave loss itself slightly increases, a sum of losses is smaller than a sum of losses in the comparative example. As a result, in the first embodiment, it is possible to perform operation with more energy saving than the comparative example.

As explained above, with the control device of the alternating-current electric motor according to the first embodiment, the voltage amplitude command value is generated on the basis of the modulation rate, which is the ratio of the direct-current voltage value and the voltage amplitude command value in the voltage command, using the PWM current distortion rate calculated as the index representing the degree of the current harmonic generated by the PWM control. Therefore, after the modulation mode (the PWM pulse mode) is selected such that the PWM current distortion rate does not suddenly change, it is made possible to further reduce the electric motor loss than in the past, and to obtain an effect that energy saving of an electric motor driving system is possible.

Second Embodiment

Figure 17:
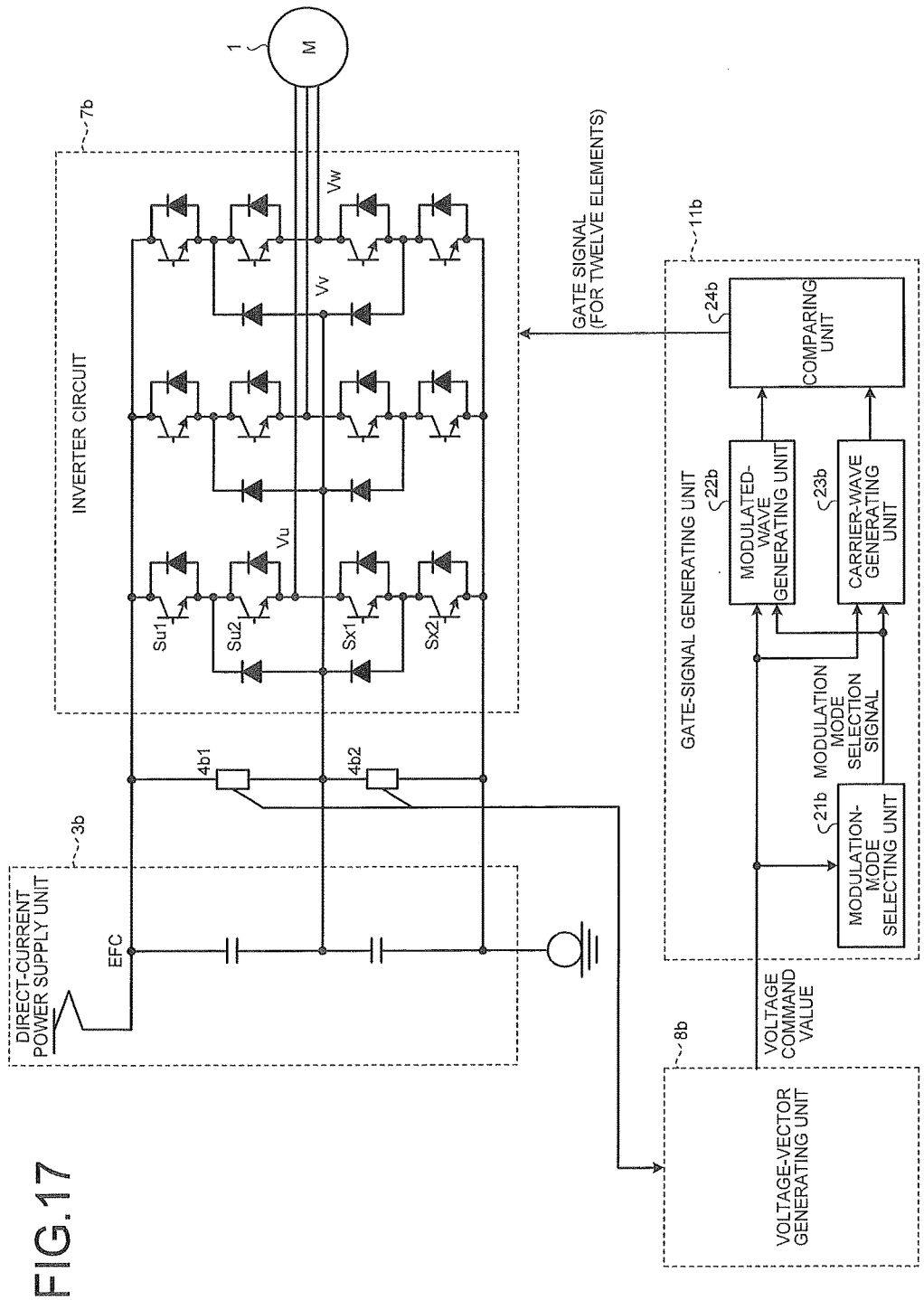
FIG. 17 is a diagram showing the detailed configurations of an inverter circuit and a gate-signal generating unit in a second embodiment.

FIG. 17 is a diagram showing the detailed configurations of an inverter circuit and a gate-signal generating unit in a second embodiment. In the configuration shown in FIG. 17, reference numerals and signs same as those of the components in the first embodiment shown in FIG. 2 are used and subscripts "b" or "b1" and "b2" are added.

In the first embodiment, the inverter circuit 7 is the two-level circuit shown in FIG. 2. On the other hand, in a use in which a power supply voltage is a high voltage as in a direct-current power supply unit 3b shown in FIG. 17, an inverter circuit is often configured by a three-level circuit (a three-level inverter) like an inverter circuit 7b shown in the figure. In the case of the three-level circuit, twelve semiconductor switching elements are provided. Note that, because the configuration (element arrangement) of the three-level circuit is publicly known, explanation of the configuration is omitted.

In the case of the three-level circuit, because the number of semiconductor switching elements increases, a gate-signal generating unit 11b is adapted to three levels. Therefore, as the second embodiment, the operations of a modulated-wave generating unit 22b, a carrier-wave generating unit 23b, and a comparing unit 24b provided in the gate-signal generating unit 11b corresponding to the three-level inverter circuit 7b are explained. The operation of a voltage-vector generating unit 8b that gives a voltage command V* to the gate-signal generating unit 11b is explained.

FIG. 18-1, FIG. 19-1, FIG. 20-1, and FIG. 21-1 are diagrams showing a modulated wave for three levels output by the modulated-wave generating unit 22b and a carrier wave for three levels output by the carrier-wave generating unit 23b. FIG. 18-2, FIG. 19-2, FIG. 20-2, and FIG. 21-2 show output voltage waveforms obtained by turning on any two elements and turning off the remaining two elements among four switch elements per one phase of the inverter circuit according to an amplitude comparison result of the carrier wave and the modulated wave. Note that, for simple explanation, only one phase (a U phase) of an inverter three-phase circuit is extracted and shown.

First, a switching operation of the three-level circuit is explained with reference to FIG. 18-1 and FIG. 18-2. In modulation of three levels, two waveforms of a carrier wave (upper) and a carrier wave (lower) are output as the carrier wave. The carrier wave (upper) is a triangular wave having a lower limit "0" and an upper limit "1". The carrier wave (lower) is a triangular wave having a lower limit "−1" and an upper limit "0". The frequency of these triangular waves is a so-called carrier wave frequency. Note that, in FIG. 18-1, the triangular wave, which is the carrier wave, is asynchronous with the modulated wave serving as a voltage command to an electric motor, which is an inverter load.

Elements to be turned on as shown in the following table are selected on the basis of a comparison result of the modulated wave and the two carrier waves (the carrier wave (upper) and the carrier wave (lower)).

TABLE 1

Element ON/OFF conditions of the three-level circuit (shown in the U phase)

| Modulated wave, carrier wave, magnitude relation | Elements to be turned on (IGBT conducted) | Elements to be turned off (IGBT unconducted) |
| --- | --- | --- |
| Carrier wave (upper) < modulated wave | Su1, Su2 | Sx1, Sx2 |
| Carrier wave (lower) ≤ modulated wave ≤ carrier wave (upper) | Su2, Sx1 | Su1, Sx2 |
| Modulated wave < carrier wave (lower) | Sx1, Sx2 | Su1, Su2 |

Figures 1, 18:
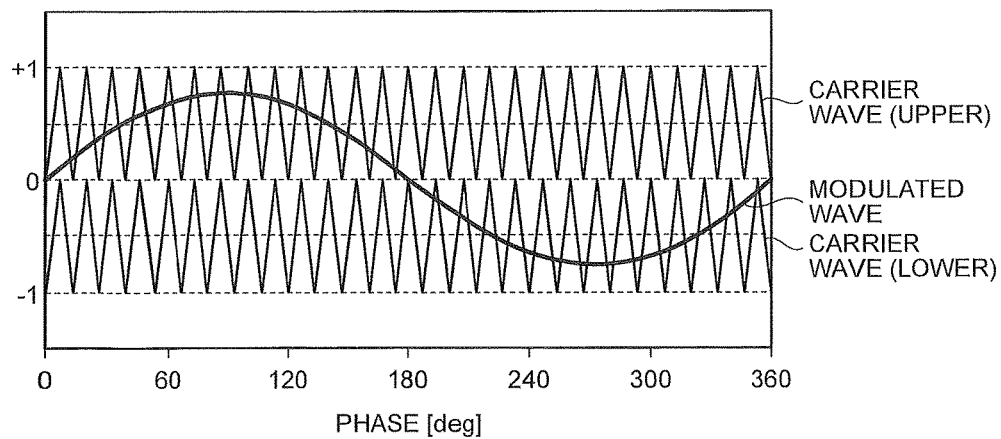
Figures 2, 18:
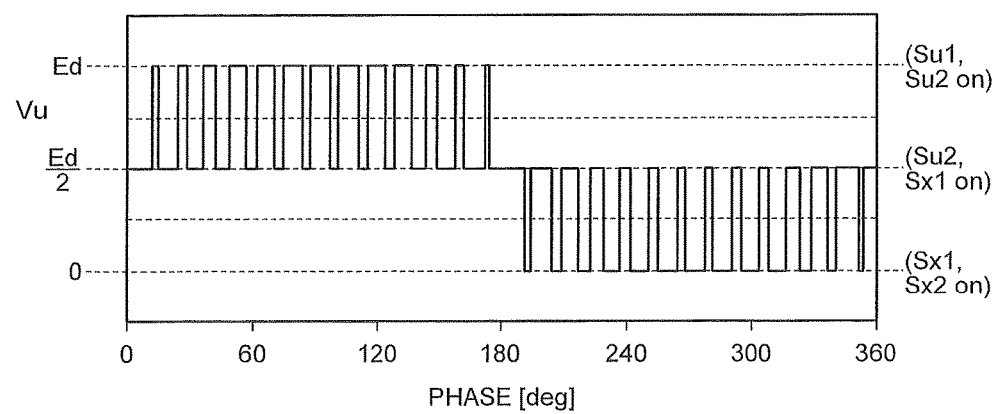

When a gate signal shown in Table 1 is output to control the semiconductor switching elements, a voltage waveform shown in FIG. 18-2 is output from a U-phase output terminal (a connecting place of Su2 and Sx1) of the inverter circuit 7b.

Figures 1, 19:
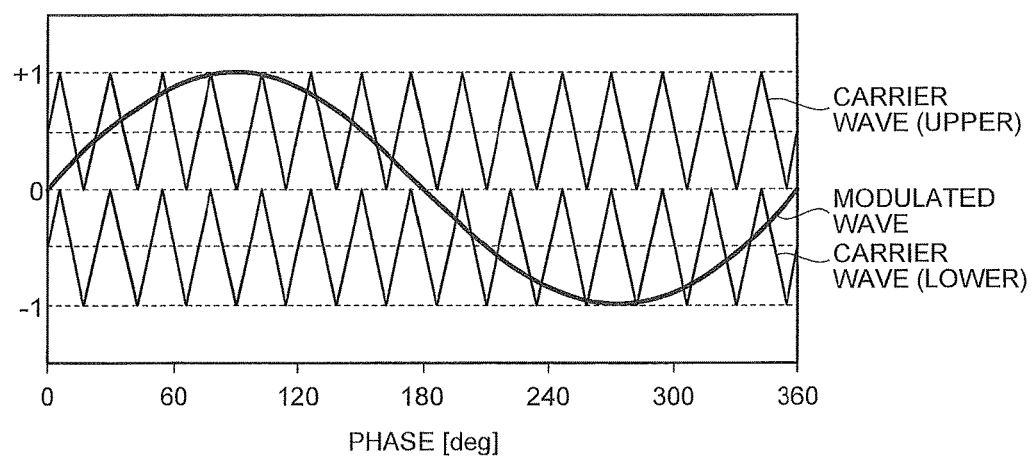
Figures 2, 19:
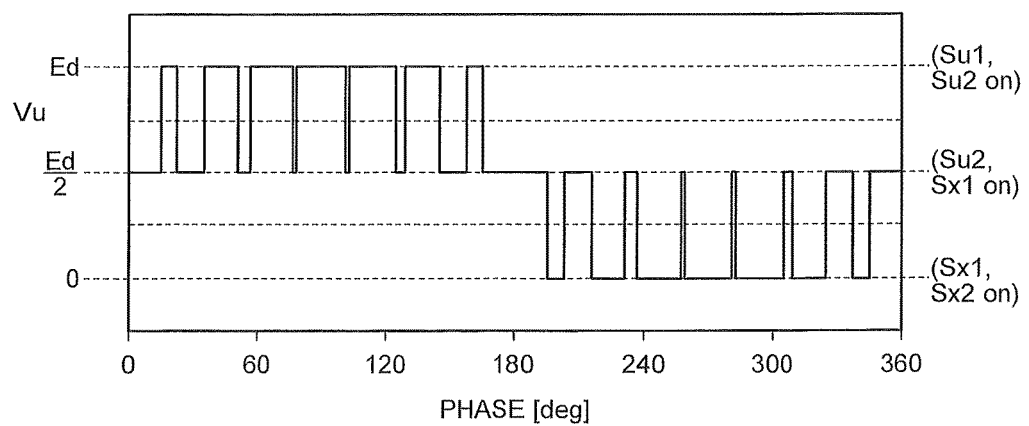

FIG. 19-1 and FIG. 19-2 are illustrated as a synchronous 15-P-mode. The carrier wave and the modulated wave are synchronized and a carrier wave frequency/a modulated wave frequency=15 is maintained. Besides, the magnitude relation between the carrier wave and the modulated wave and a relation among elements to be turned on are equivalent to the relations shown in Table 1.

Figures 1, 20:
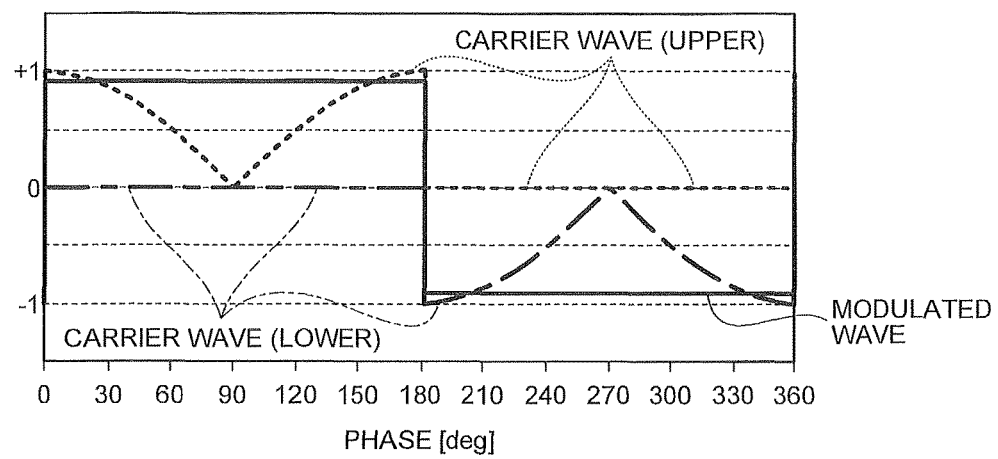
Figures 2, 20:
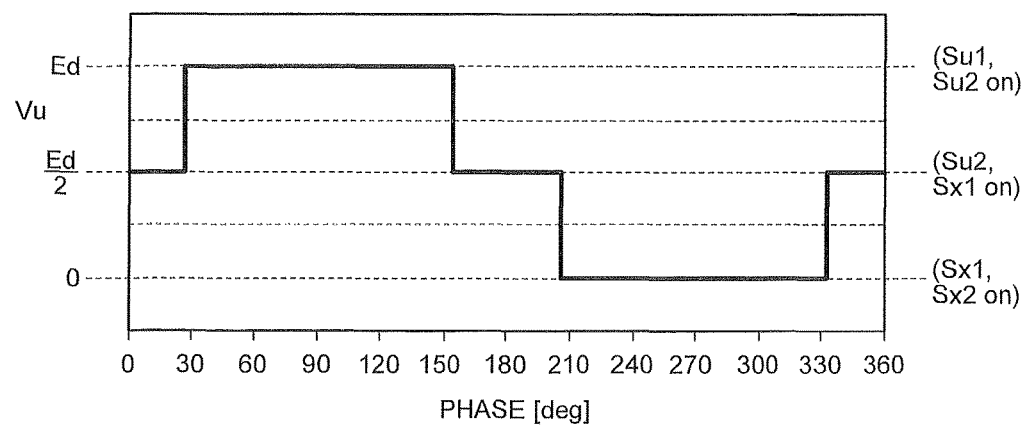
Figures 1, 21:
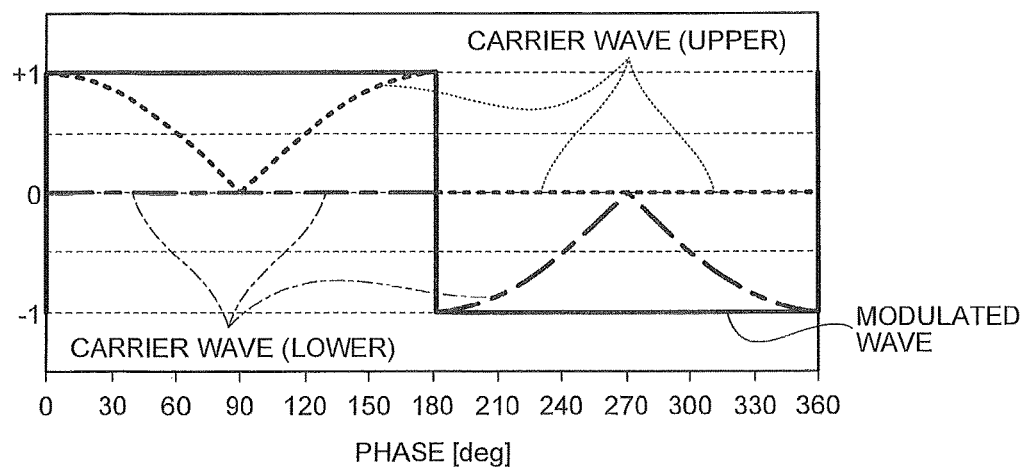
Figures 2, 21:
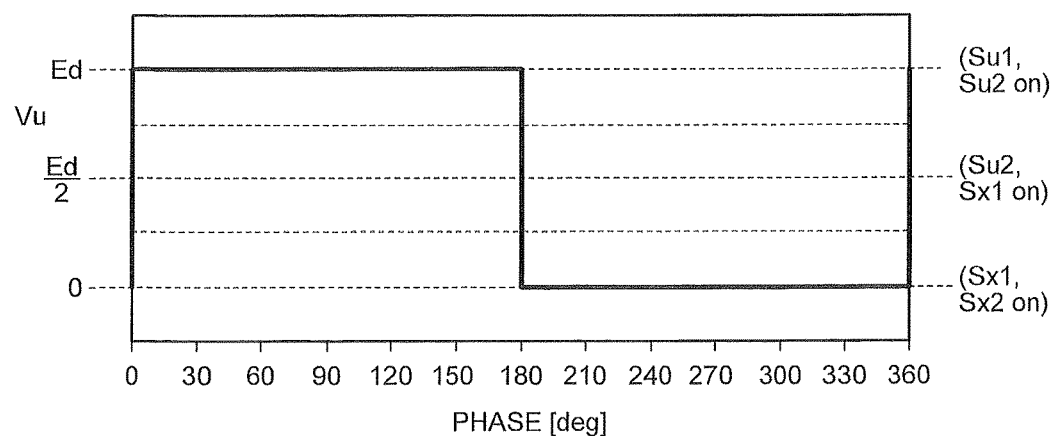

Both of FIG. 20-1 and FIG. 21-1 show the carrier wave and the modulated wave in the 1-dash (simply referred to as 1' as well). Basically, this is a publicly known technology described in FIG. 2 and the like of Patent Literature 4. Note that a calculation method for the carrier wave and the modulated wave disclosed in this literature is specifically described as shown in the following table.

TABLE 2

The carrier wave and the modulated wave of a three-level 1-dash pulse mode

| Voltage command phase angle θ* | 0 ≤ θ* < 180 [deg] | 180 ≤ θ* < 360 [deg] |
| --- | --- | --- |
| Modulated wave | +PMF | −PMF |
| Carrier wave (upper) | +\|cosθ*\| | 0 |
| Carrier wave (lower) | 0 | −\|cosθ*\| |

(PMF: modulation rate [p.u] 0 ≤ PMF ≤ 1)

When a gate signal shown in Table 2 is output to control the semiconductor switching elements, voltage waveforms shown in FIG. 20-1 and FIG. 21-2 are output as inverter output voltages (output voltages of the inverter circuit 7b). In this way, when the 1'-pulse mode is used, it is possible to perform control for smoothly transitioning the magnitude of a voltage up to the modulation rate 1.

Like the modulation-mode selecting unit 21 in the first embodiment, a modulation-mode selecting unit 21b (see FIG. 17) in the second embodiment switches the asynchronous PWM mode, the synchronous 15-pulse mode, and the synchronous 1'-pulse mode such that a PWM current distortion rate characteristic to a modulation rate is continuously smooth. An example of the PWM current distortion rate characteristic to the modulation rate obtained in this way is shown in FIG. 22.

In the three-level circuit, when a mode is switched to make the PWM current distortion rate continuous, a minimum distortion rate condition transitions to a slightly lower modulation rate and the vicinity of the modulation rate 95% changes to a PWM current distortion rate minimum condition. Compared with FIG. 9 showing the PWM current distortion rate characteristic in the two-level circuit, a slightly low modulation rate side is suitable.

Figure 22:
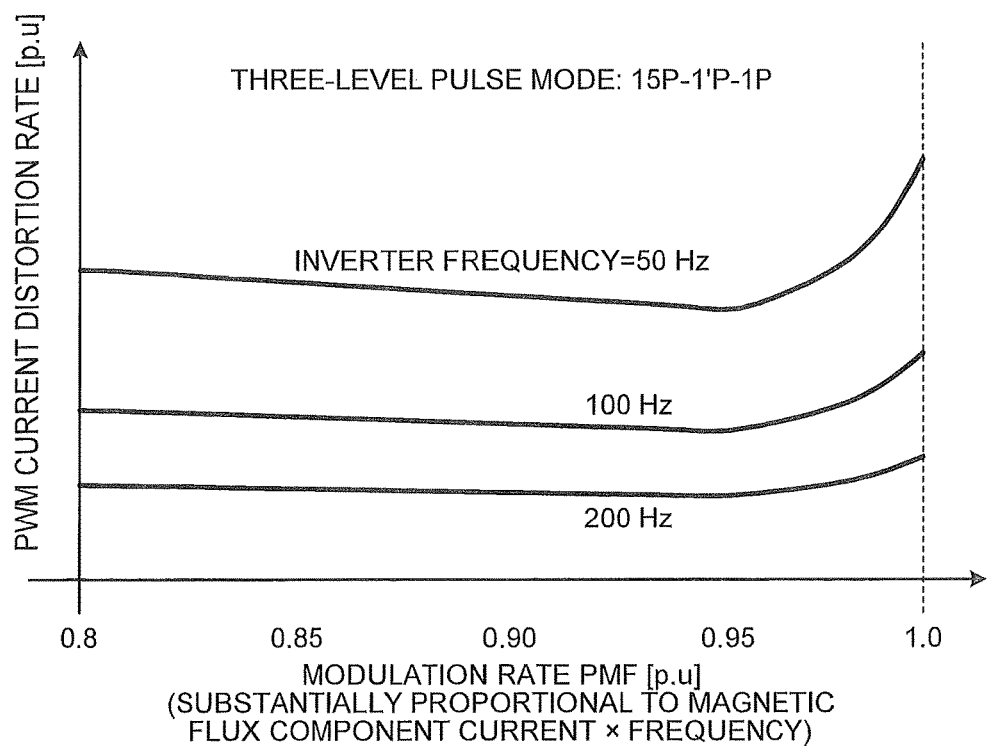
FIG. 22 is a diagram showing an example of a PWM current distortion rate characteristic implemented in a PWM-current-distortion-rate-characteristic storing unit in the second embodiment.

Therefore, in the voltage-vector generating unit 8b in the second embodiment, a PWM current distortion rate characteristic obtained by converting FIG. 22 into a map or an approximate function is implemented in a PWM-current-distortion-rate-characteristic storing unit 31b. A difference between the voltage-vector generating unit 8 in the first embodiment and the voltage-vector generating unit 8b in the second embodiment can be basically considered only a difference of characteristics stored in the PWM-current-distortion-rate-characteristic storing units 31 and 31b. With the implementation of such a PWM current distortion rate characteristic, a magnetic flux and a modulation rate, which are an electric motor loss minimum condition that takes into account a PWM harmonic, are calculated taking into account characteristics of the three levels. It is made possible to perform operation under the electric motor loss minimum condition.

According to the second embodiment explained above, even when the inverter circuit is the three-level configuration, after the modulation mode (the PWM pulse mode) is selected such that the PWM current distortion rate does not suddenly change, the electric motor is operated while sequentially calculating the electric motor minimum condition that takes into account the PWM harmonic. Consequently, it is possible to further reduce an electric motor loss than in the past and obtain an effect that it is possible to perform energy saving of an electric motor driving system.

Third Embodiment

Figure 23:
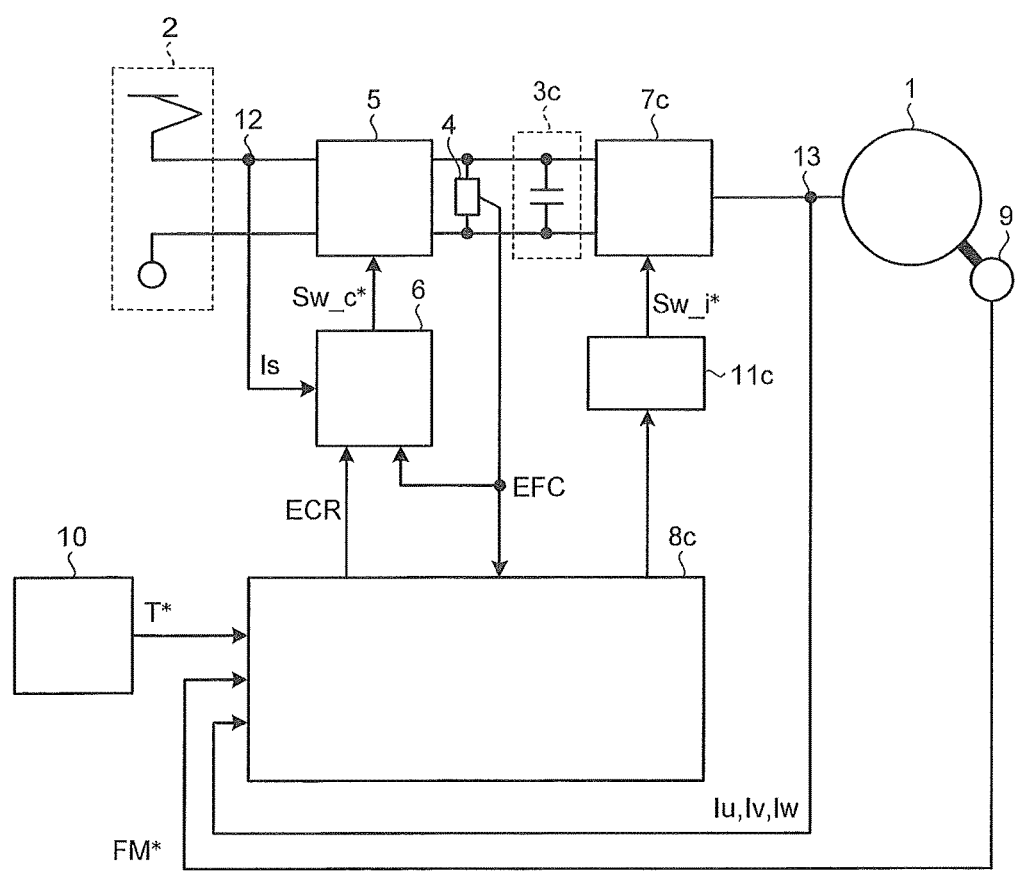
FIG. 23 is a diagram showing the configuration of an alternating-current-electric-vehicle driving system including a control device of an alternating-current electric motor according to a third embodiment.
Figure 24:
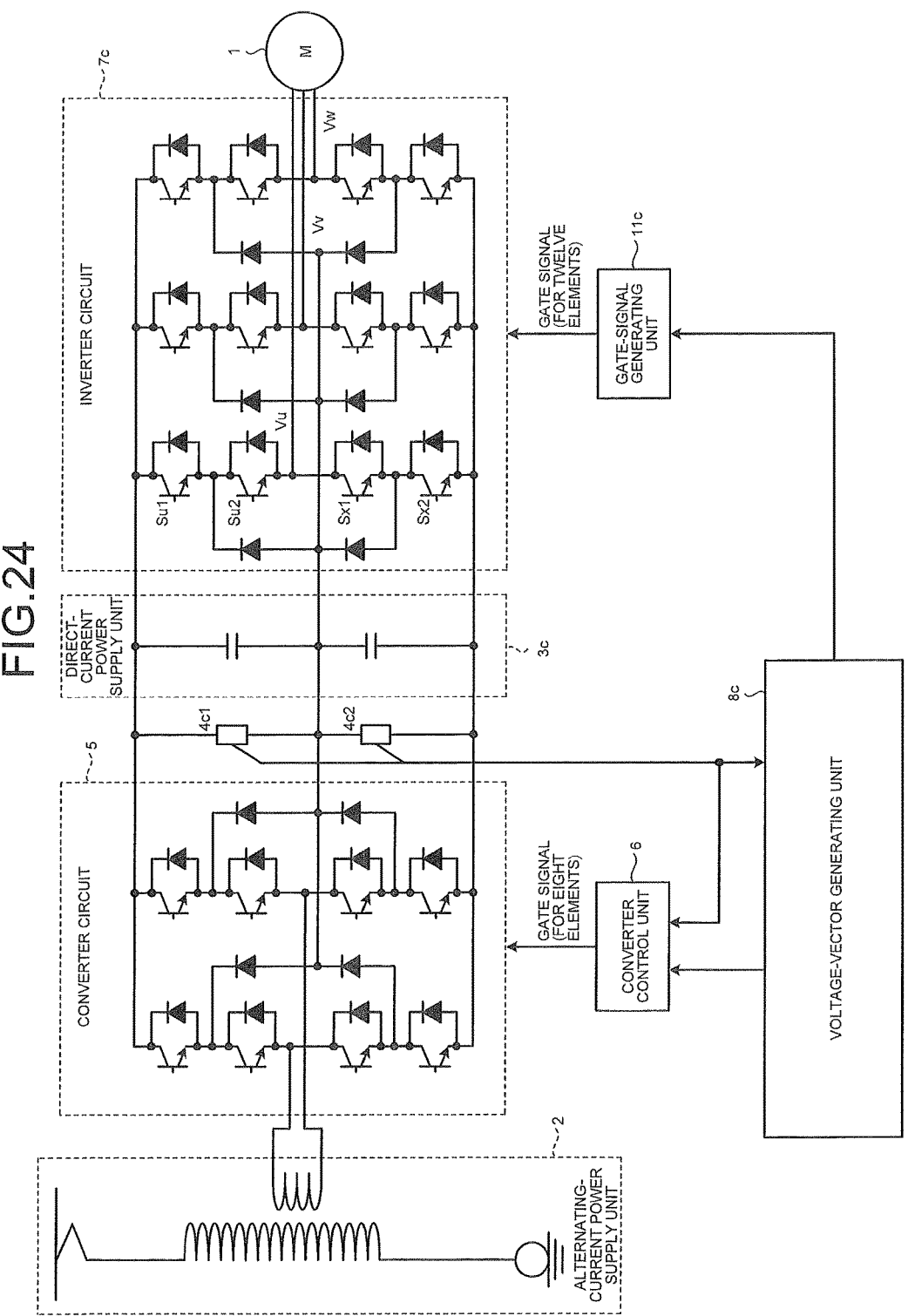
FIG. 24 is a diagram showing the detailed configurations of an inverter circuit and a gate-signal generating unit in the third embodiment.

FIG. 23 is a diagram showing the configuration of an alternating-current-electric-vehicle driving system including a control device of an alternating-current electric motor according to a third embodiment. FIG. 24 is a diagram showing the detailed configurations of an inverter circuit and a gate-signal generating unit in the third embodiment. Whereas the first and second embodiments are the direct-current-electric-vehicle driving system that receives power supply from a direct-current overhead wire, the third embodiment is the alternating-current-electric-vehicle driving system that receives power supply from an alternating-current overhead wire. Note that, in the configurations shown in FIG. 23 and FIG. 24, reference numerals and signs same as those of the components shown in FIG. 17 and FIG. 18 are used and subscripts "c" or "c1" and "c2" are used instead of the subscripts "b" or "b1 and "b2".

The alternating-current-electric-vehicle driving system is different from the first and second embodiments in that, as shown in FIG. 23, electric power is received from an alternating-current power supply unit 2 and, after alternating-current to direct-current power conversion is performed by a converter circuit 5, direct-current power is supplied to a direct-current power supply unit 3c.

In the alternating-current-electric-vehicle driving system, when the direct-current power supply unit 3c is provided using the converter circuit 5, the magnitude of the voltage of the direct-current power supply unit 3c, that is, an input voltage to an inverter circuit 7c can be adjusted by control. A converter control unit 6, which controls the converter circuit 5, generates, on the basis of the direct-current voltage value EFC of the direct-current power supply unit 3c acquired by direct-current voltage detecting units 4c1 and 4c2, a direct-current voltage command ECR output from a voltage-vector generating unit 8c, a voltage value of the alternating-current power supply unit 2, and an alternating-current input current value to the converter circuit 5, ON and OFF signals for controlling conduction of semiconductor switching elements configuring the converter circuit 5. Consequently, an alternating-current to direct-current power converting operation by the converter circuit 5 occurs. The direct-current voltage value EFC is controlled so as to follow the direct-current voltage command ECR. The inverter circuit 7c is controlled using, as an input, the voltage of the direct-current power supply unit 3c kept in this way and the alternating-current electric motor 1 is driven.

The voltage-vector generating unit 8c in the third embodiment is the same as the first and second embodiments in that the voltage-vector generating unit 8c outputs a voltage amplitude command value (including the modulation rate calculation output of Formula (1.1) described above) to a gate-signal generating unit 11c to drive the inverter circuit 7c. However, the voltage-vector generating unit 8c outputs the direct-current voltage command value ECR to the converter control unit 6 in association with the above operation. The associated operation is explained below.

Figure 25:
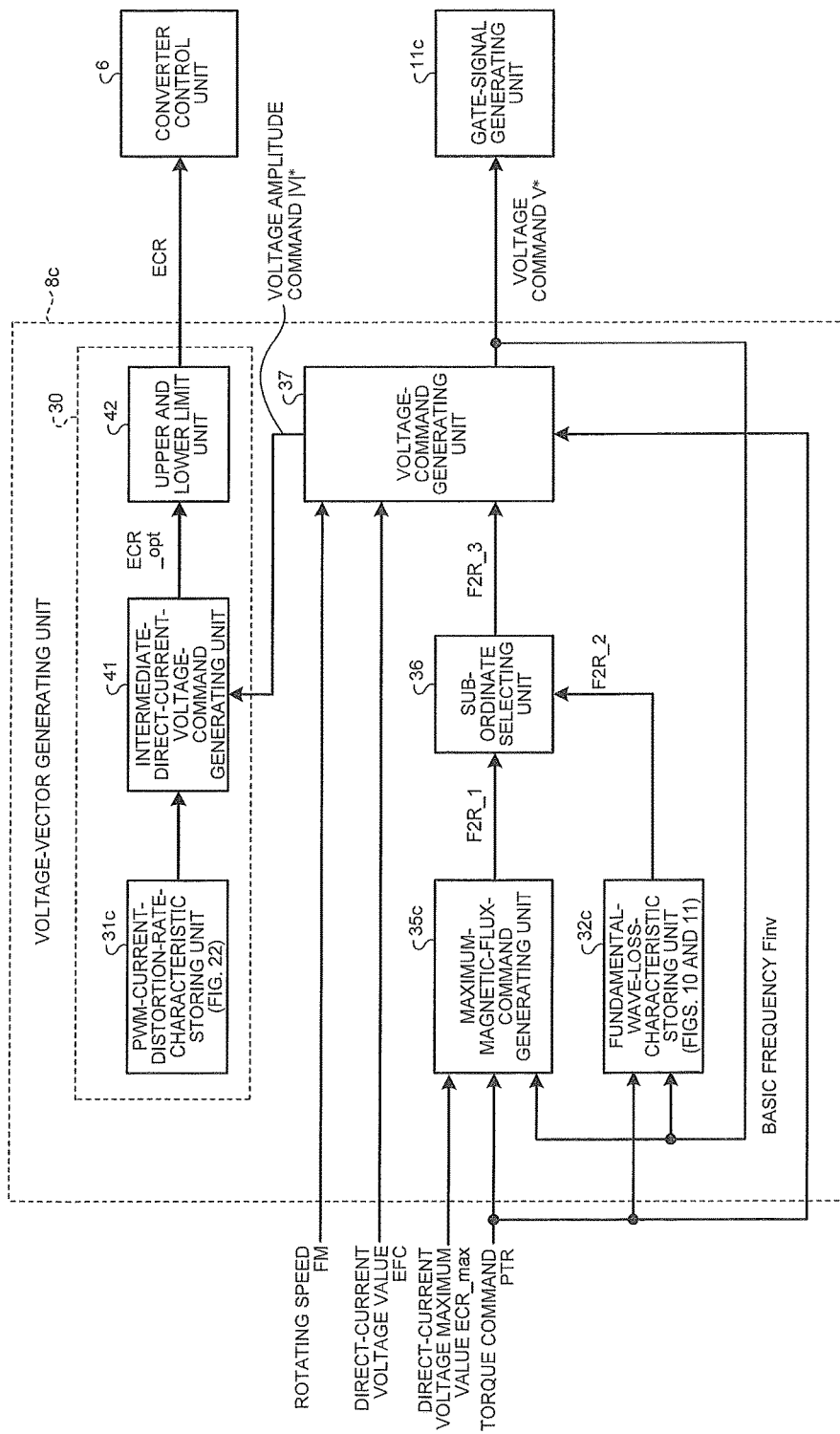
FIG. 25 is a diagram showing the detailed configuration of a voltage-vector generating unit in the third embodiment.

FIG. 25 is a diagram showing the detailed configuration of the voltage-vector generating unit 8c. The voltage-vector generating unit 8c includes a direct-current-voltage-command-value generating unit 30 that outputs the direct-current voltage command ECR to the converter control unit 6. The direct-current-voltage-command-value generating unit 30 outputs, as the direct-current voltage command ECR, via an upper and lower limit unit 42, ECR_opt (detailed content is explained below) generated by an intermediate-direct-current-voltage-command generating unit 41. A direct-current voltage that the converter circuit 5 can output has a physical upper limit value and a physical lower limit value. Therefore, in general, the direct-current-voltage-command-value generating unit 30 includes the upper and lower limit unit 42. Note that the direct-current voltage has the upper limit value and the lower limit value because of reasons explained below.

(i) Direct-Current Voltage Command ECR Lower Limit Value

In the case of a PWM converter shown in FIG. 24, an amplitude peak of a supplied alternating-current voltage is the lower limit value of the direct-current voltage that can be output. The lower limit value is set also taking into account a margin for control of the direct-current voltage.

(ii) Direct-Current Voltage Command ECR Upper Limit Value

In semiconductor elements used for configuring a converter circuit and an inverter circuit as shown in FIG. 24, there is a withstand voltage upper limit to normally operate the semiconductor elements without being broken. The upper limit value is set not to exceed the limit and also taking into account a margin for control.

In the third embodiment, unlike the first and second embodiments, the direct-current voltage value EFC, which is the input to the inverter circuit 7c, can be controlled by the converter circuit 5 while observing the limitation of the upper and lower limits. Therefore, control of the alternating-current electric motor 1 is performed using the degree of freedom of the control.

In the first and second embodiments, both of the PWM-current-distortion-rate-characteristic storing unit 31 and the fundamental-wave-loss-characteristic storing unit 32 are used to control the alternating-current electric motor 1 and the inverter circuit 7. However, in the third embodiment, a fundamental-wave-loss-characteristic storing unit 32c is used for control of the inverter circuit 7c as in the first and second embodiments and a PWM-current-distortion-rate-characteristic storing unit 31c is used for control of the converter circuit 5 making use of a degree of freedom for setting a direct-current voltage as a control target as well.

Driving control of the inverter circuit 7c is explained. In the fundamental-wave-loss-characteristic storing unit 32c, as shown in FIG. 7, a fundamental wave loss characteristic is stored in which a physical amount (in FIG. 7, a modulation rate) equivalent (related) to a magnetic flux amount is plotted on the abscissa. The fundamental-wave-loss-characteristic storing unit 32c calculates, on the basis of the torque command PTR and a fundamental wave frequency command of a voltage, a magnetic flux condition for minimizing a fundamental wave loss and outputs the magnetic flux condition as F2R_2.

On the other hand, a maximum-magnetic-flux-command generating unit 35c outputs a magnetic flux value F2R_1 with which an inverter modulation rate is the maximum "1" in an upper limit value EFC_max of a direct-current voltage that the converter circuit 5 can control and output. The subordinate selecting unit 36 selects a lower value (a smaller value) of F2R_1 and F2R_2 and outputs the value to the voltage-command generating unit 37 as the magnetic flux command value F2R_3 at the final stage. The voltage-command generating unit 37 calculates, on the basis of the magnetic flux command value F2R_3, the torque command PTR, the electric angle rotating speed FM of the alternating-current electric motor, and a circuit constant of the alternating-current electric motor 1, a command value of a three-phase alternating current voltage that should be applied to the alternating-current electric motor 1. In this case, a signal actually output to the gate-signal generating unit 11c is output via the calculation formula of the modulation rate (Formula (1.1) described above). A value of the direct-current voltage value EFC at this point is a value actually output and applied according to the control of the converter circuit 5, specifically, a sum of outputs of the direct-current-voltage detecting units 4c1 and 4c2. The value is used as a modulation rate.

An intermediate direct-current voltage value used in the voltage-command generating unit 37 is EFC, which is a signal obtained by detecting an actual value after control. An input value for the maximum-magnetic-flux-command generating unit 35c to calculate F2R_1 is a control upper limit value ECR_max of the intermediate direct-current voltage. As the intermediate direct-current voltage value and the input value, different values are respectively used, and this is a characteristic not present in the first and second embodiments. An effect by this characteristic can be explained together with a control method for the converter circuit 5 by setting of the converter voltage command ECR explained below.

The intermediate-direct-current-voltage-command generating unit 41 calculates a direct-current voltage command ECR_1 as indicated by the following formula from the PWM-current-distortion-rate-characteristic storing unit 31c that stores the command amplitude |V|* of the alternating-current voltage that should be applied to the alternating-current electric motor and the PWM current distortion rate in the alternating-current electric motor 1.

$$ECR\_opt = \frac{2}{\pi} \cdot \frac{|V|*}{PMFopt} \quad (2.1)$$

In the above formula, PMFopt indicates a modulation rate of a condition for minimizing the PWM current distortion rate in the PWM current distortion rate characteristic stored in the PWM-current-distortion-rate-characteristic storing unit 31c. As explained in the first and second embodiments, the characteristics shown in FIG. 9 or FIG. 22 are implemented according to a form (the two-level circuit or the three-level circuit) of the inverter circuit 7. That is, the third embodiment is also based on the premise that the gate-signal generating unit 11c performs selection and switching of the pulse mode such that the PWM current distortion rate does not become discontinuous. In the case of the third embodiment in which the inverter circuit 7 is the three-level circuit as shown in FIG. 24, the gate-signal generating unit 11c is operated on the basis of FIG. 22.

The characteristics shown in FIG. 22 can be implemented in the PWM-current-distortion-rate-characteristic storing unit 31c. The PWM-current-distortion-rate characteristic storing unit 31c can sequentially calculate the distortion rate minimum modulation rate condition PMFopt on the basis of the voltage frequency command ωinv* sequentially output by the voltage-command generating unit 37. On the other hand, as shown in FIG. 9 and FIG. 22, the PWM current distortion rate has a characteristic that the PWM current distortion rate is the minimum in the vicinity of a substantially fixed modulation rate condition without depending on a frequency. Therefore, the output of the PWM-current-distortion-rate-characteristic storing unit 31c can be simplified as follows:

in the case of the two levels: fixed at PMFopt=0.97
in the case of the three levels: fixed at PMFopt=0.95

The command amplitude |V|* in Formula (3.1) is an amplitude command value calculated on the basis of the magnetic flux command F2R_2 for minimizing a fundamental wave loss derived from the fundamental-wave-loss-characteristic storing unit 32c of the alternating-current electric motor 1 as explained above. That is, under the premise that the direct-current voltage value EFC is controlled to ECR_opt of Formula (3.1) by the converter circuit 5, a voltage-command generating unit 37c in this embodiment can output, to the gate-signal generating unit 11c and the inverter circuit 7c, a command value that reflects all of a minimum distortion rate condition PMF_opt based on the PWM-current-distortion-rate-characteristic storing unit 31c, the optimum magnetic flux command F2R_2 based on the fundamental-wave-loss-characteristic storing unit 32c, and the voltage amplitude |V|* in that case.

The operation of the voltage-vector generating unit 8c has been explained heretofore. Specifically, the operation of the entire system performed when the alternating-current electric motor 1 is operated from low speed to high speed according to a torque command indicated by a torque 100% performance curve shown in FIG. 12 is explained with reference to FIG. 26. Note that FIG. 26(a) indicates the direct-current voltage value EFC, FIG. 26(b) indicates the modulation rate PMF of the inverter circuit 7c, and FIG. 26(c) indicates the PWM current distortion rate in the alternating-current electric motor. Note that, in the figures, the operation by the third embodiment is indicated by a solid line and the operation by the conventional technology is indicated by a broken line.

Figure 26:
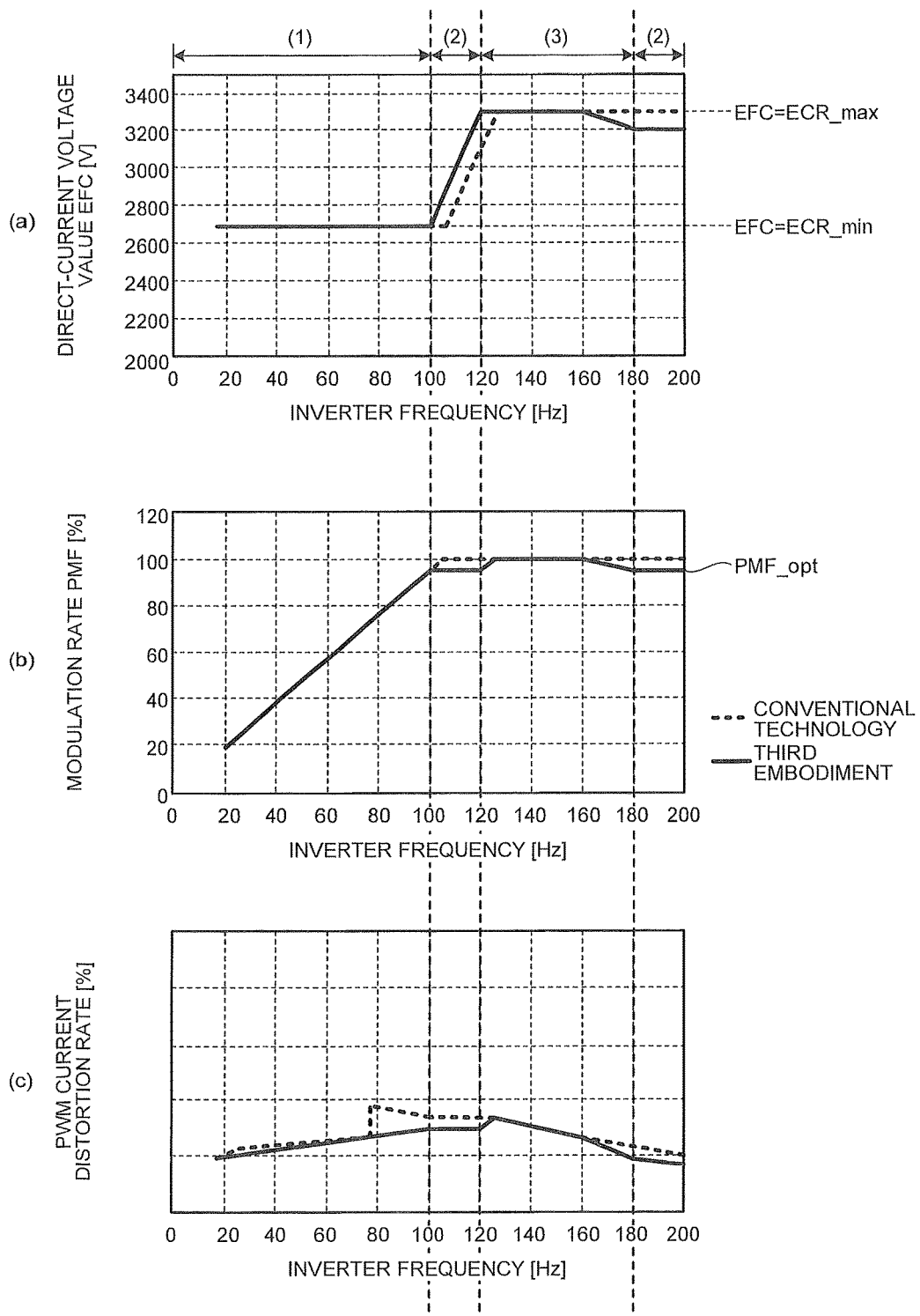
FIG. 26 is a diagram showing a relation among a direct-current voltage, a modulation rate, and a PWM current distortion rate during variable speed driving with a large output in the third embodiment.

As explained above, the direct-current voltage command ECR is determined while being limited by a lower limit value ECR_min and an upper limit value ECR_max determined from main circuit design in later processing given by ECR_opt of Formula (3.1). The direct-current voltage value EFC follows ECR according to the control operation of the converter control unit 6 and the converter circuit 5. Therefore, states of the ECR and the EFC are divided into the following three states. FIG. 26 is explained according to the division.

(1) A region of EFC=ECR=ECR_min
(2) A region of EFC=ECR=ECR_opt
(3) A region of EFC=ECR=ECR_max (1) The region of EFC=ECR=ECR_min In this region, the voltage amplitude command value |V|* of the alternating-current electric motor for the low speed region is small and the ECR_opt obtained by Formula (3.1) is smaller than the lower limit value ECR_min. Therefore, the alternating-current electric motor is operated at a fixed voltage according to the ECR limited to a lower limit value ECT_min by the upper and lower limit unit 42. Under this condition, in the modulation rate calculation of Formula (1.1) in the voltage-command generating unit 37, the denominator is a fixed value EFC_min and the amplitude command value |V|* increases according to speed. Therefore, the modulation rate PMF increases substantially in proportion to speed and a rotation frequency in a range in which the modulation rate PMF is lower than PMF_opt. Note that, because EFC≠EFC_opt and PMF≠PMF_opt, a harmonic loss reduction by the PWM is not taken into account. However, when the PWM mode selection switching with a sudden change in the PWM current distortion rate suppressed is performed as in this application, as shown in FIG. 9 and FIG. 22, in a region where the modulation rate is lower than the PWM current distortion rate minimum condition point PMF_opt, there is no large change in PWM current distortion rate and the current harmonic remains little. Therefore, it is possible to avoid an increase in the PWM harmonic loss in practice. Note that, when the PWM selections is easily implemented as the conventional technology, as shown in FIG. 26(*c*), a sudden change or increase in the current distortion is caused and a harmonic loss occurs.

(2) The region of EFC=ECR=ECR_opt

The region of (2) is operation that is a largest characteristic of the third embodiment. As indicated by (2) in FIG. 26(*b*), according to the principle of Formula (3.1) described above, it is possible to vary speed while maintaining the optimum modulation rate PMF_opt for suppressing the PWM harmonic of the alternating-current electric motor 1. The direct-current voltage value EFC_opt for attaining this is attained by the control by the converter circuit 5. Consequently, it is made possible to suppress both of a fundamental wave loss and a PWM harmonic loss in the alternating-current electric motor 1. Note that, in the conventional technology, the operation for prioritizing the transition to, for example, the maximum modulation rate 100% without taking into account the optimum modulation rate PMF_opt is performed. Therefore, the PWM harmonic loss increases.

(3) The region of EFC=ECR=ECR_max

In this region, because of high speed or large load torque, the voltage amplitude command value |V|* of the alternating-current electric motor is large, and EFC_opt in Formula (3.1) is larger than the upper limit ECR_max. Therefore, the alternating-current electric motor is operated at a fixed voltage according to the direct-current voltage command ECR limited to an upper limit value ECT_max by the upper and lower limit unit 42. Under this condition, in the modulation rate calculation of Formula (1.1) in the voltage-command generating unit 37, the denominator is the fixed value EFC_max and the amplitude command value |V|* increases according to speed. Therefore, the modulation rate PMF increases apart from a PWM loss minimum condition PMR_opt.

However, when the modulation rate PMF reaches 1, the alternating-current electric motor is not operated exceeding the modulation rate PMF. The alternating-current electric motor is stably and smoothly controlled while maintaining the modulation rate PMF=1. This is because the maximum-magnetic-flux-command generating unit 35*c* calculates the magnetic flux command F2R_1 for transitioning the operation at the maximum ECR_max of the voltage and a modulation rate PMF1 and the control at the modulation rate 1 is attained via the subordinate selecting unit 36 and the voltage-command generating unit 37.

Figure 27:
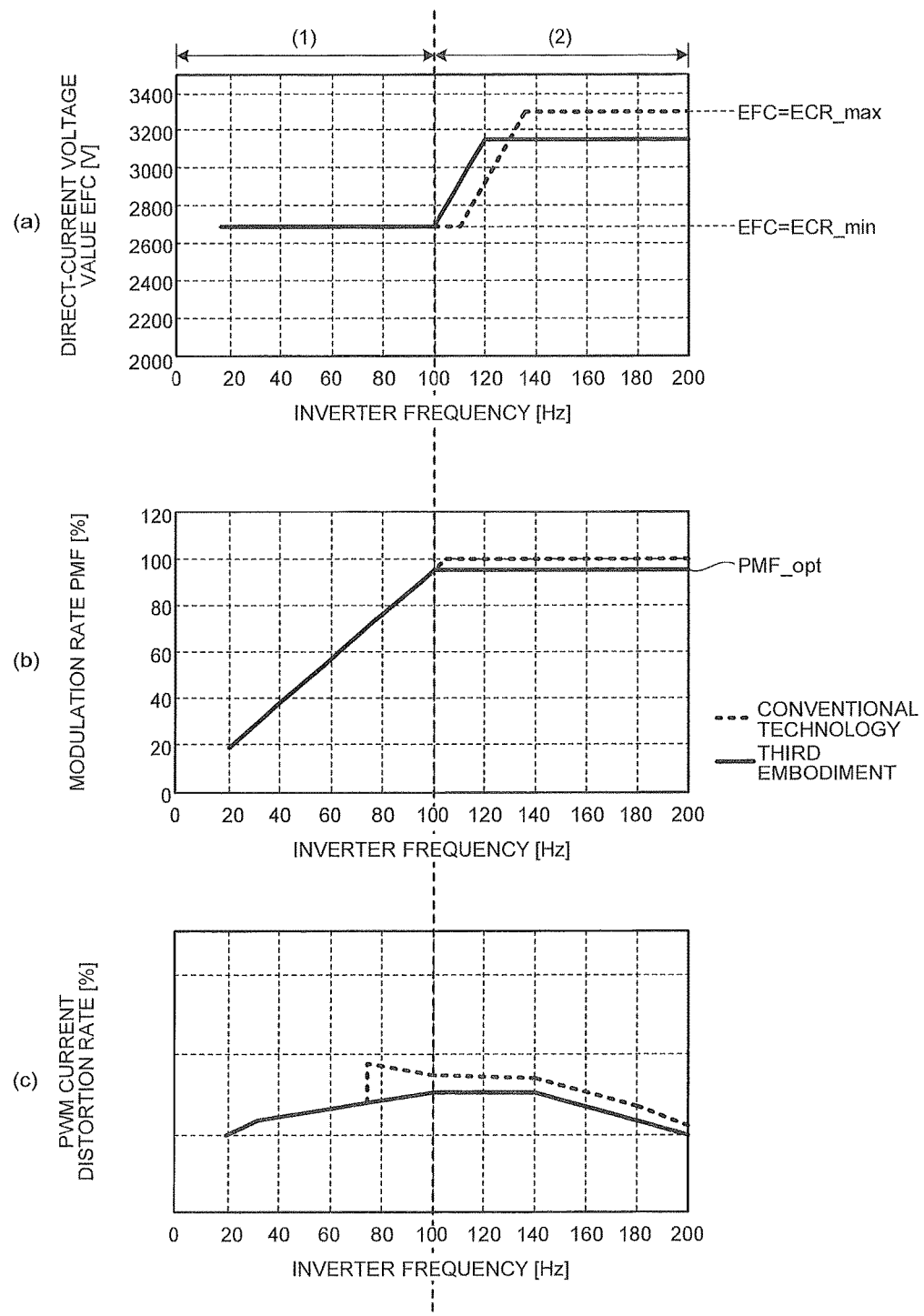
FIG. 27 is a diagram showing a relation among a direct-current voltage, a modulation rate, and a PWM current distortion rate in the case of variable speed driving under a low output condition in the third embodiment.

On the other hand, in a speed range in which a pattern of a torque command becomes small in a required specification of a torque characteristic to speed like the high-speed region (c) shown in FIG. 12, F2R_2 sometimes can be selected again as a magnetic flux command under an operation condition. In that case, the operation transitions in the same manner as (2) in the paragraph As a condition of an operation command for the alternating-current electric motor 1, when the alternating-current electric motor 1 is operated with a light load as indicated by the torque 50% performance curve shown in FIG. 12, the voltage amplitude command value |V|* of the alternating-current electric motor does not increase in the first place. In some case, ECR_opt of Formula (1.9) does not exceed the upper limit value ECR_max over all the speed regions and the region of (3) is not generated. This operation example is shown in FIG. 27.

As explained above, in the third embodiment, according to the operation in which the converter circuit 5, the inverter circuit 7*c*, and the alternating-current electric motor 1 are appropriately associated by the voltage-vector generating unit 8*c*, the inverter circuit 7*c* performs the operation for minimizing a fundamental wave loss of the alternating-current electric motor 1 and the converter circuit 5 performs the operation for minimizing a PWM harmonic of the alternating-current electric motor 1. Under an operation condition in which it is difficult to attain both of the operations, it is possible to stably transition a state amount according to switch control to the magnetic flux command value F2R_1 for the inverter circuit 7*c*.

According to the third embodiment explained above, when an input direct-current voltage to the inverter circuit 7*c* can be adjusted by the converter circuit 5, after the modulation mode (the PWM pulse mode) is selected such that the PWM current distortion rate does not suddenly change, the PWM harmonic suppression of the alternating-current electric motor 1 is performed by the direct-current voltage control by the converter and the control for minimizing a fundamental wave loss is performed by the magnetic flux command generation and the generation of the inverter output voltage. Consequently, it is made possible to further reduce an electric motor loss than in the past and obtain an effect that energy saving of an alternating-current electric motor driving system is possible.

Fourth Embodiment

In the third embodiment explained above, in the operation region of (3) in FIG. 26, the intermediate direct-current voltage EFC is transitioned at EFC_max. That is, in the third embodiment, in the operation region where the intermediate direct-current voltage EFC is transitioned at EFC_max, a situation in which the intermediate direct-current voltage EFC is fixed is the same as the situation in the first and second embodiments.

Figure 28:
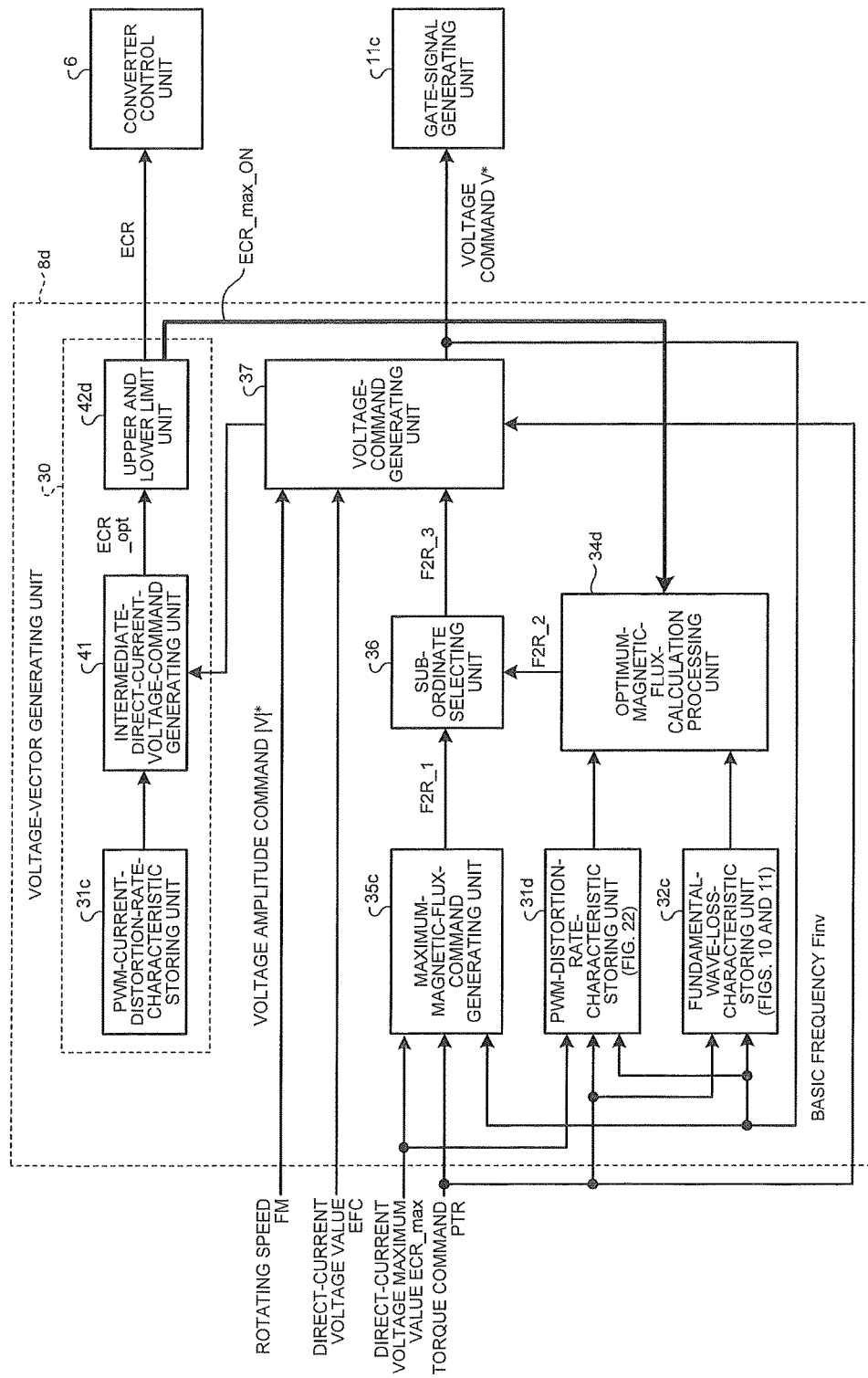
FIG. 28 is a diagram showing the configuration of a voltage-vector generating unit in a fourth embodiment.

Therefore, in the operation region of (3), if the generation of the voltage command to the inverter circuit 7c is a form same as the operation in the first and second embodiments, it is possible to further reduce a loss. The configuration of a voltage-vector generating unit 8d for realizing this form is FIG. 28. According to FIG. 28, a PWM-current-distortion-rate-characteristic storing unit 31d and an optimum-magnetic-flux-calculation processing unit 34d used during direct-current voltage fixing as in the first and second embodiments are added to the voltage-vector generating unit 8c in the third embodiment. As a limiter operation situation of the intermediate direct-current voltage command, an upper and lower limit unit 42d generates a signal ECR_max_on indicating "1" when ECR reaches the upper limit value ECR_max and indicating "0" otherwise and outputs the signal ECR_max_on to an optimum-magnetic-flux-calculation processing unit 34d. Then, control for switching the operation of the optimum-magnetic-flux-calculation processing unit 34d is performed as explained below.

(i) ECR_max_on=0 (when ECR<ECR_max)

In this case, the optimum-magnetic-flux-calculation processing unit 34d is caused to perform operation same as the operation in the third embodiment. That is, the optimum-magnetic-flux-calculation processing unit 34d selects, from characteristics stored in the fundamental-wave-loss-characteristic storing unit 32c, a magnetic flux command value for minimizing a fundamental wave loss of the alternating-current electric motor 1 and outputs the magnetic flux command value to the subordinate selecting unit 36 as F2R_2. Therefore, a specific operation is the same as the operation in (1) and (2) in FIG. 26.

ECR_max_on=1 (when ECR=ECR_max)

In this case, operation is the same as the voltage command generation performed when the direct-current voltage value EFC reaches ECR_max (fixed) in the first and second embodiments. Under a situation in which the direct-current voltage value EFC is controlled to be fixed, the optimum-magnetic-flux-calculation processing unit 34d calculates, taking into account characteristics of both of the PWM-current-distortion-rate-characteristic storing unit 31d and the fundamental-wave-loss-characteristic storing unit 32c, a magnetic flux command value for minimizing a loss of a sum of the PWM-current-distortion-rate-characteristic storing unit 31d and the fundamental-wave-loss-characteristic storing unit 32c and outputs the magnetic flux command value to the subordinate selecting unit 36 as F2R_2. In the operation region of (3) in the third embodiment, the optimum-magnetic-flux-calculation processing unit 34d does not have a function of cooperating a PWM loss reduction and a fundamental wave loss reduction in the case of ECR_ECR_max. On the other hand, in the fourth embodiment, even in a situation of ECR=ECR_max, as in the first and second embodiments, there is an effect that it is made possible to perform operation calculating a magnetic flux command taking into account a sum of the PWM harmonic loss and the fundamental wave loss.

Fifth Embodiment

In the fourth embodiment explained above, the optimum-magnetic-flux-calculation processing unit 34d calculates, taking into account the characteristics of both of the PWM-current-distortion-rate-characteristic storing unit 31d and the fundamental-wave-loss-characteristic storing unit 32c, the magnetic flux command value for minimizing the loss of the sum of the PWM-current-distortion-rate-characteristic storing unit 31d and the fundamental-wave-loss-characteristic storing unit 32c, that is, an optimum magnetic flux command for reducing an overall loss of the alternating-current electric motor 1, and outputs the magnetic flux command value to the subordinate selecting unit 36. However, without providing the fundamental-wave-loss-characteristic storing unit 32c, the optimum-magnetic-flux-calculation processing unit 34d can be configured to generate a magnetic flux command value using only an output of the PWM-current-distortion-rate-characteristic storing unit 31d, that is, an optimum magnetic flux command value for reducing a PWM loss of the alternating-current electric motor 1, and output the magnetic flux command value to the subordinate selecting unit 36. Even with such a configuration, a harmonic loss due to the PWM control is taken into account. As a result, an effect equal to or larger than a fixed value is obtained for a loss reduction of the alternating-current electric motor 1.

Note that the configurations explained in the first to fifth embodiments above are examples of the configuration of the present invention. It goes without saying that the configurations can be combined with other publicly-known technologies or can be configured to be changed to, for example, omit a part of the configurations without departing from the spirit of the present invention.

Further, in the embodiments, the content of the invention is explained assuming the application to the electric vehicle. However, an application field of the present invention is not limited to this. It goes without saying that application to industrial fields in which alternating-current electric motors are used is possible.

INDUSTRIAL APPLICABILITY

As explained above, the present invention is useful as a control device of an alternating-current electric motor that enables a further reduction in an electric motor loss.

REFERENCE SIGNS LIST

1 Alternating-current electric motor
2 Alternating-current power supply unit
3a, 3b, 3c Direct-current power supply units
4, 4c1, 4c2 Direct-current-voltage detecting units
5 Converter circuit
6 Converter control unit
7, 7b, 7c Inverter circuits
8, 8b, 8c, 8d Voltage-vector generating units
9 Speed detecting unit
10 Torque-command-value generating unit
11, 11b, 11c Gate-signal generating units
13 Electric-motor-current detecting unit
21, 21b Modulation-mode selecting units
22, 22b Modulated-wave generating units
23b Carrier-wave generating unit
24, 24b Comparing units
30 Direct-current-voltage-command-value generating unit
31, 31b, 31c, 31d PWM-current-distortion-rate-characteristic storing units
32, 32c Fundamental-wave-loss-characteristic storing units
34, 34d Optimum-magnetic-flux-calculation processing units
35 Magnetic-flux-command-for-1P generating unit
35c Maximum-magnetic-flux-command generating unit 36 Subordinate selecting unit
37, 37c Voltage-command generating units
41 Intermediate-direct-current-voltage-command generating unit
42, 42d Upper and lower limit units

The invention claimed is:

1. A control device of an alternating-current electric motor, comprising:
an inverter circuit that converts direct-current power into alternating-current power and supplies the alternating-current power to the alternating-current electric motor;
a direct-current-voltage detecting unit that detects a direct-current voltage value applied to the inverter circuit;
a gate-signal generating unit that outputs a gate signal to the inverter circuit on the basis of a modulation rate that is a ratio between a voltage amplitude command value and the direct-current voltage value, wherein
the gate-signal generating unit includes a synchronous multi-pulse mode, and a synchronous 3-dash pulse mode, and according to an increase of the modulation rate, the gate-signal generating unit transitions a modulation mode to the synchronous multi-pulse mode, and to the synchronous 3-dash pulse mode in this order, and the gate-signal generating unit switches the synchronous multi-pulse mode to the synchronous 3-dash pulse mode in a state a current distortion rate of the alternating-current electric motor is keeping continuity.

2. A control device of an alternating-current electric motor, comprising:
an inverter circuit that converts direct-current power into alternating-current power and supplies the alternating-current power to the alternating-current electric motor;
a direct-current-voltage detecting unit that detects a direct-current voltage value applied to the inverter circuit;
a gate-signal generating unit that outputs a gate signal to the inverter circuit on the basis of a modulation rate that is a ratio between a voltage amplitude command value and the direct-current voltage value, wherein
the gate-signal generating unit includes a synchronous multi-pulse mode, and a synchronous 3-dash pulse mode, and according to an increase of the modulation rate, the gate-signal generating unit transitions a modulation mode to the synchronous multi-pulse mode, and to the synchronous 3-dash pulse mode in this order, and the gate-signal generating unit switches the synchronous multi-pulse mode to the synchronous 3-dash pulse mode in a state the modulation rate of the inverter circuit is between 0.94 and 0.97.

3. The control device of the alternating-current electric motor according to claim 1, wherein the gate-signal generating unit includes a one-pulse mode, and according to an increase of the modulation rate, the gate-signal generating unit transitions the modulation mode to the synchronous multi-pulse mode, to the synchronous 3-dash pulse mode, and to the one-pulse mode in this order.

4. A control device of an alternating-current electric motor, comprising:
an inverter circuit that converts direct-current power into alternating-current power and supplies the alternating-current power to an alternating-current electric motor;
a gate-signal generating unit that outputs a gate signal to the inverter circuit; and a voltage-vector generating unit that outputs a voltage amplitude command value to the gate-signal generating unit, wherein
the voltage-vector generating unit calculates a magnetic flux command in which a combined overall loss of a fundamental wave loss and a PWM harmonic loss of the alternating-current electric motor becomes minimum, and generates the voltage amplitude command value from the magnetic flux command;
wherein the voltage-vector generating unit includes:
an optimum-magnetic-flux-calculation processing unit that calculates an optimum-magnetic-flux-command value, which reduces a PWM loss of the alternating-current electric motor, based on the PWM-current-distortion-rate; and
a voltage-command generating unit that generates a voltage-command value based on the optimum-magnetic-flux-command value, and the rotating speed and the direct-current voltage value, and that outputs the voltage-command value to the gate-signal generating unit.

5. The control device of an alternating-current electric motor according to claim 4, wherein
the voltage-vector generating unit calculates a PWM current distortion rate based on a modulation rate, and a circuit constant and a rotating speed of the alternating-current electric motor, and calculates a magnetic flux command in which the combined overall loss of the alternating-current electric motor becomes minimum from the PWM current distortion rate.

6. The control device of an alternating-current electric motor according to claim 4, wherein
the voltage-vector generating unit includes a PWM-current-distortion-rate-characteristic storing unit that stores the PWM current distortion rate characteristic and calculates the PWM-current-distortion-rate based on a fundamental wave frequency of a voltage, output from the inverter circuit, and the PWM-current-distortion-rate-characteristic.

7. The control device of an alternating-current electric motor according to claim 4, wherein
the voltage-vector generating unit further includes:
a fundamental-wave-loss-characteristic storing unit that outputs a fundamental-wave-loss-characteristic of the alternating-current electric motor based on a torque command and the rotating speed, and
the optimum-magnetic-flux-calculation processing unit calculates an optimum-magnetic-flux command value, which reduces the combined overall loss of the alternating-current electric motor, based on the PWM-current-distortion-rate and the fundamental-wave-loss-characteristic.

8. The control device of the alternating-current electric motor according to claim 4, further including,
a converter circuit that supplies direct-current power to the inverter circuit; and
a converter control unit that controls a direct-current voltage value output from the converter circuit, wherein
the voltage-vector generating unit outputs a direct-current voltage command value, calculated based on the PWM-current-distortion-rate, to the converter control unit.

9. The control device of the alternating-current electric motor according to claim 4, wherein
the inverter circuit is a two-level inverter, and the gate-signal generating unit includes a modulation mode of a 3-dash pulse mode.

10. The control device of the alternating-current electric motor according to claim 4, wherein the inverter circuit is a three-level inverter, and the gate-signal generating unit includes a modulation mode of a 1-dash pulse mode.

\* \* \* \* \*